United States Patent
Kii

(10) Patent No.: US 10,407,264 B2
(45) Date of Patent: Sep. 10, 2019

(54) MEDIUM TRANSPORTING DEVICE, IMAGE READING APPARATUS, AND OPENING/CLOSING DEVICE

(71) Applicant: SEIKO EPSON CORPORATION, Tokyo (JP)

(72) Inventor: Soichiro Kii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/867,447

(22) Filed: Jan. 10, 2018

(65) Prior Publication Data

US 2018/0229955 A1    Aug. 16, 2018

(30) Foreign Application Priority Data

Jan. 24, 2017    (JP) ................................. 2017-010418

(51) Int. Cl.
| | |
|---|---|
| *B65H 7/20* | (2006.01) |
| *B65H 5/06* | (2006.01) |
| *G03G 15/00* | (2006.01) |
| *H04N 1/12* | (2006.01) |

(Continued)

(52) U.S. Cl.
CPC ............... *B65H 7/20* (2013.01); *B65H 5/062* (2013.01); *G03G 15/602* (2013.01); *G03G 15/605* (2013.01); *B65H 2402/24* (2013.01); *B65H 2402/45* (2013.01); *B65H 2601/11* (2013.01); *G03G 21/1633* (2013.01);

(Continued)

(58) Field of Classification Search
CPC ............ B65H 2402/24; B65H 2402/45; B65H 2601/11; G03G 21/1623; G03G 21/1628; G03G 21/1633; G03G 21/1638
See application file for complete search history.

(56) References Cited

U.S. PATENT DOCUMENTS

| | | | |
|---|---|---|---|
| 7,155,777 B2 * | 1/2007 | Connors | ............ H04N 1/00519 |
| | | | 16/286 |
| 7,369,794 B2 * | 5/2008 | Kawai | ...................... B41J 29/02 |
| | | | 399/107 |

(Continued)

FOREIGN PATENT DOCUMENTS

| | | |
|---|---|---|
| JP | 2005-170637 A | 6/2005 |
| JP | 2007-168930 A | 7/2007 |

(Continued)

*Primary Examiner* — Jeremy R Severson
(74) *Attorney, Agent, or Firm* — Workman Nydegger

(57) ABSTRACT

A medium transporting device including: a main body; an opening/closing body; and a holding unit, in which the holding unit includes a rotation member that has a supporting portion which can be displaced between raised up and dropped down by rotation thereof and supports the opening/closing body and applies a force to the opening/closing body in an opening direction by the supporting portion engaging with the opening/closing body, and a pressing unit that presses the rotation member in the raised direction, and in which the holding unit further includes a configuration in which a force which is applied to the opening/closing body in the opening direction due to a pressing force to the rotation member generated by the pressing unit and a force that the opening/closing body tries to close are balanced with each other according to a predetermined rotation angle of the rotation member.

10 Claims, 36 Drawing Sheets

(51) Int. Cl.
  *H04N 1/00* (2006.01)
  *G03G 21/16* (2006.01)
(52) U.S. Cl.
  CPC ..... *G03G 21/1638* (2013.01); *H04N 1/00551* (2013.01); *H04N 1/1225* (2013.01)

(56) References Cited

U.S. PATENT DOCUMENTS

| | | | | |
|---|---|---|---|---|
| 7,769,322 | B2 * | 8/2010 | Ishihara | G03G 21/1628 |
| | | | | 399/125 |
| 8,874,000 | B2 * | 10/2014 | Kim | G03G 21/1647 |
| | | | | 399/125 |
| 9,635,202 | B2 * | 4/2017 | Tomatsu | H04N 1/00551 |
| 2005/0127598 | A1 | 6/2005 | Nagura | |

FOREIGN PATENT DOCUMENTS

| JP | 2014-197737 A | 10/2014 |
|---|---|---|
| JP | 2016-164595 A | 9/2016 |

* cited by examiner

MEDIUM TRANSPORTING DEVICE, IMAGE READING APPARATUS, AND OPENING/CLOSING DEVICE

INCORPORATED BY REFERENCE

The entire disclosure of Japanese Patent Application No. 2017-010418, filed Jan. 24, 2017 is expressly incorporated by reference herein.

BACKGROUND

1. Technical Field

The present disclosure relates to a medium transporting device that transports a medium and an image reading apparatus including the medium transporting device. In addition, the disclosure relates to an opening/closing device including an opening/closing body which can be opened/closed with respect to a main body portion.

2. Related Art

A scanner, which is an example of an image reading apparatus, is provided with an autodocument feeder (also referred to as ADF) of a document and thus there is a case where automatic feeding and reading of a plurality of documents are performed. As a configuration of such an autodocument feeder of a document, a configuration is adopted in which a document is fed from a mounting table (paper feed tray) on which the document is placed, is inverted in U shape, is transported to a reading position, and then is discharged toward a discharge tray, as disclosed in JP-A-2016-164595.

In the image reading apparatus described in JP-A-2016-164595, the document transporting device is configured to include a lower portion unit and an upper portion unit which can be opened/closed with respect to the lower portion unit. The upper portion unit is configured so that a roller constituting a transporting roller pair for transporting a document is provided on one side thereof, a document transporting path is exposed and nip of the transporting roller pair is eliminated by the upper portion unit being opened and a document can be removed in a case where a jam is generated.

Although the upper portion unit (hereinafter referred to as "opening/closing body") is configured to be capable of maintaining an independent open state by a rotation angle thereof opening to be more than 90 degrees and thus the center of gravity of the opening/closing body exceeding a center of a rotation shaft, there is a fear that the opening/closing body unintentionally closes during a work such as a jam treatment.

As the related art for solving such a problem, it is conceivable to provide a supporting member that can hold the opening/closing body in an open state.

In addition, there is a fear that the opening/closing body vigorously closes and thus an unpleasant collision sound is generated or the device is damaged, when a hand of a user releases the opening/closing body at the time of closing the opening/closing body.

Accordingly, as the related art, it is conceivable to provide a damping mechanism on the rotation shaft of the opening/closing body and thus a speed is damped when the opening/closing body is closed.

However, in the supporting member for holding the opening/closing body in a closed state, when the user generally tries to close the opening/closing body from an open state at a predetermined angle, an operability thereof is poor since it is necessary to hold the supporting member using one hand of the user and to support the opening/closing body using the other hand thereof. In addition, since the collision sound is generated when the supporting member itself falls down, it is necessary to pay attention to the operation of the supporting member and eventually, the supporting member will be inferior in operability.

In addition, when the damping mechanism is provided on the rotation shaft as described above, although the rotation speed is damped when the opening/closing body is closed, since the damping mechanism becomes a resistance when the opening/closing body is opened, the operability thereof decreases when the opening/closing body is opened, if a one-way clutch is provided to solve the problem, increase in cost will be further incurred.

SUMMARY

An advantage of some aspects of the disclosure is to realize further improvement of operability when an opening/closing body is opened/closed while complication of a structure thereof and an increase in cost are suppressed as much as possible.

According to a first aspect of the disclosure, there is provided a medium transporting device including: a main body portion that constitutes a medium transporting path through which a medium is transported; an opening/closing body that is provided to be rotatable with respect to the main body portion, forms the medium transporting path between the opening/closing body and the main body portion by closing thereof, and exposes the medium transporting path by opening thereof; and a holding unit that holds the opening/closing body in a state where the opening/closing body is open, in which the holding unit includes a rotation member that has a supporting portion which can be switched between a state of be raised up and a state of being dropped down by rotation thereof and supports the opening/closing body and applies a force to the opening/closing body in an opening direction by the supporting portion engaging with the opening/closing body, and a pressing unit that presses the rotation member in the raised direction, and in which the holding unit further includes a configuration in which a force that the supporting portion applies to the opening/closing body in the opening direction due to a pressing force to the rotation member generated by the pressing unit and a force that the opening/closing body tries to close are balanced with each other according to a predetermined rotation angle of the rotation member.

According to this aspect, since the supporting member of the rotation member applies a force to the opening/closing body in the opening direction when the opening/closing body is closed, the opening/closing member opens using a smaller force.

In addition, since there is the configuration in which the force that the supporting portion of the rotation member applies to the opening/closing body in the opening direction and the force that the opening/closing body tries to close are balanced with each other according to the rotation angle of the rotation member, the opening/closing body can be closed by a user applying the force to the opening/closing body in the closing direction in a state of being balanced. In other words, the user can close the opening/closing body using only one hand thereof and thus good operability is obtained.

Further, since the supporting portion of the rotation member applies a force to the opening/closing body in the opening direction even when the opening/closing body is closed, the vigorous closing of the opening/closing body can be avoided and the generation of collision sound and damage thereof can be suppressed or avoided when the opening/closing body is closed.

Since the above functions can be realized by at least one of the holding unit, the complication of the structure and increase in cost can be suppressed.

According to the configuration, the rotation member may engage with and disengage from the opening/closing body and may disengage from the opening/closing body by the rotation angle of the rotation member reaching the upper limit when the opening/closing body exceeds a predetermined opening angle.

If the rotation member rotates more than necessary when the opening/closing member opens, there is a case where the opening/closing body comes in a state of being locked without the opening/closing body rotating in a direction in which the rotation member falls down when the opening/closing body tries to close, according to an angle formed between the opening/closing body and the rotation member.

According to this configuration, since the rotation member has a configuration in which the rotation member can engage with and disengage from the opening/closing body and the rotation member disengages from the opening/closing body by the rotation angle of the rotation member reaching the upper limit when the opening/closing body exceeds a predetermined opening angle, the problem described above can be avoided.

According to the configuration, the pressing unit may not apply an external force in the raised direction to the rotation member in a state where the opening/closing body is closed.

Since the opening/closing body forms a medium transporting path along with the main body portion in a closed state, there is a fear that if the opening/closing body is opened even slightly, jam is generated in the medium transporting path.

According to this configuration, since the pressing unit does not apply the external force in the raised direction to the rotation member in a state where the opening/closing body is closed, the problem that the opening/closing body is opened slightly inappropriately can be suppressed.

According to the configuration, the rotation member may include a cam follower on a rotation center side thereof and the pressing unit may include a cam which presses the cam follower and a pressing member that applies a pressing force to the cam.

According to this configuration, the pressing unit can be configured by a simple structure and at a low cost.

According to the configuration, a plurality of rotation angles of the rotation member may be set in which the force that the supporting portion of the rotation member applies to the opening/closing body in the opening direction and the force that the opening/closing body tries to close are balanced with each other.

According to this configuration, the opening/closing body can be held at a plurality of opening angles and thus the convenience of the user is improved.

According to the configuration, the opening/closing body may include a sliding contact surface which is positioned on an upper side with respect to the supporting portion and with which the supporting portion is slidingly in contact when the opening/closing body is opened/closed, and a plurality of protrusions may be provided on the sliding contact surface with a predetermined gap in a sliding contact direction with the supporting portion.

According to this configuration, since the opening/closing body includes the sliding contact surface which is positioned on the upper side with respect to the supporting portion and with which the supporting portion is slidingly in contact when the opening/closing body is opened/closed and the plurality of protrusions are provided on the sliding contact surface with the predetermined gap in the sliding contact direction with the supporting portion, that is, since there is a configuration in which the opening angle of the opening/closing body is held by the supporting portion being caught by the protrusion, a configuration in which the opening/closing body is held at the plurality of opening angles can be obtained with a simplified structure and at a low cost.

According to the configuration, the opening/closing body may have a sliding contact surface which is positioned on an upper side with respect to the supporting portion and with which the supporting portion is slidingly in contact when the opening/closing body is opened/closed and a first engaging portion which is positioned so as to interpose the supporting portion between the opening/closing body and the sliding contact surface in a state where the opening/closing body is closed and when the opening/closing body is opened from a closed state, the first engaging portion applies a force to the supporting portion in a raised direction.

If there is a large gap between the sliding contact surface and the supporting portion when the opening/closing body is opened from a closed state, when the rotation member be raised up by the pressing force of the pressing unit, there is a fear that supporting portion abuts against the sliding contact surface vigorously and thus an unpleasant collision sound is generated.

However, according to this configuration, since the supporting portion is interposed between the sliding contact surface and the first engaging portion in a state where the opening/closing body is closed and when the opening/closing body is opened from a closed state, the first engaging portion applies a force to the supporting portion in a raised direction, the problem (collision sound) described above can be suppressed or avoided without the large gap being formed between the sliding contact surface and the supporting portion when the opening/closing body is opened from a closed state.

According to the configuration, the opening/closing body may include a second engaging portion which is positioned at a location farther from the supporting portion than the first engaging portion below the supporting portion in a state where the opening/closing body is closed, an inclined surface may be formed below the second engaging portion, and thus the second engaging portion may ride over the supporting portion and enter below the supporting portion by the inclined surface when the opening/closing body is closed from a state where the opening/closing body is opened and the rotation member falls down.

According to this configuration, since the opening/closing body includes a second engaging portion which is positioned at a location farther from the supporting portion than the first engaging portion below the supporting portion in a state where the opening/closing body is closed, even if the supporting portion is in a state of not being capable of being raised by the damage or the wear of the first engaging portion, the second engaging portion can be raised the supporting portion and thus the function of the holding unit is secured.

On the other hand, in a case where such a second engaging portion is provided, when the rotation member falls down independently from the opening/closing body by the hand of the user, even if the opening/closing body tries to close, there is a fear that the second engaging portion collides with the supporting portion and thus the opening/closing body cannot be closed.

However, according to this configuration, the inclined surface is formed below the second engaging portion, and when the opening/closing body is closed from a state where the opening/closing body is open and the rotation member falls down, since the second engaging portion can ride over the supporting portion and enter below the supporting portion by the inclined surface, the opening/closing body can be in a state of correctly being closed.

According to a second aspect of the disclosure, there is provided an image reading apparatus including: a reading unit that reads a medium; and the medium transporting device according to any one of the configurations and that transports the medium.

According to this aspect, in the image reading apparatus, the same operations and effects as that of any one of the configurations described above are obtained.

According to a third aspect of the disclosure, there is provided an opening/closing device including: a main body portion; an opening/closing body that can be opened/closed at least a portion of the main body portion by rotating with respect to the main body portion; and a holding unit that holds the opening/closing body in a state where the opening/closing body is open, in which the holding unit includes a rotation member that has a supporting portion which can be switched between a state of being raised up and a state of being dropped down by rotation thereof, supports the opening/closing body, and applies a force to the opening/closing body in an opening direction by the supporting portion engaging with the opening/closing body, and a pressing unit that presses the rotation member in the raised direction, and in which the holding unit further includes a configuration in which a force that the supporting portion applies to the opening/closing body in the opening direction due to a pressing force to the rotation member generated by the pressing unit and a force that the opening/closing body tries to close are balanced with each other according to a predetermined rotation angle of the rotation member.

According to this aspect, in the opening/closing device including the main body portion and the opening/closing body, the same operation and effect as those of the first aspect described above can be obtained.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
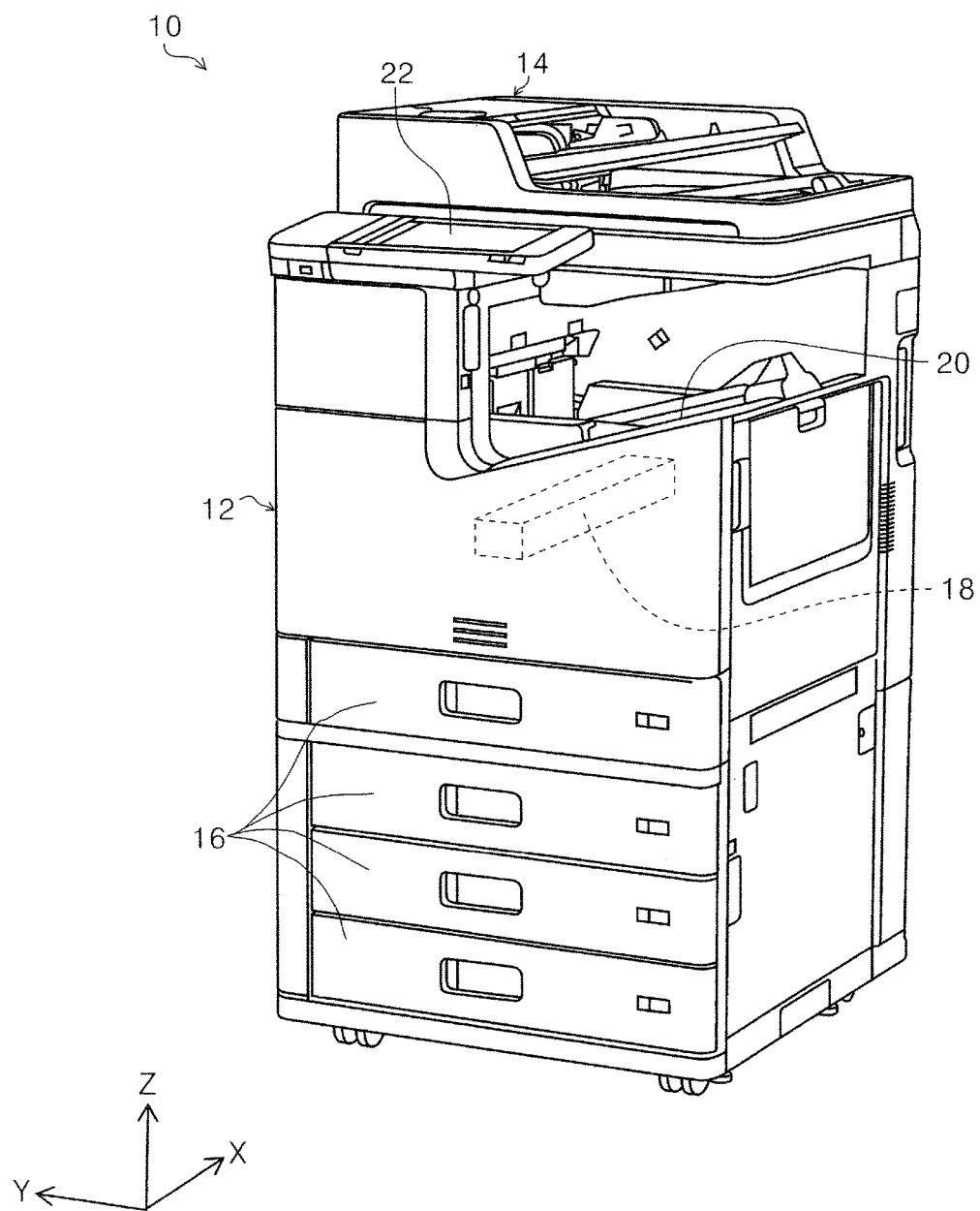
FIG. 1 is an external perspective view illustrating a printer according to the disclosure.

Hereinafter, embodiments of the present disclosure will be described with reference to the drawings. In the respective examples, the same configurations will be denoted by the same reference numerals, be described only in the first example, and descriptions thereof will be omitted in the following examples.

Figure 2:
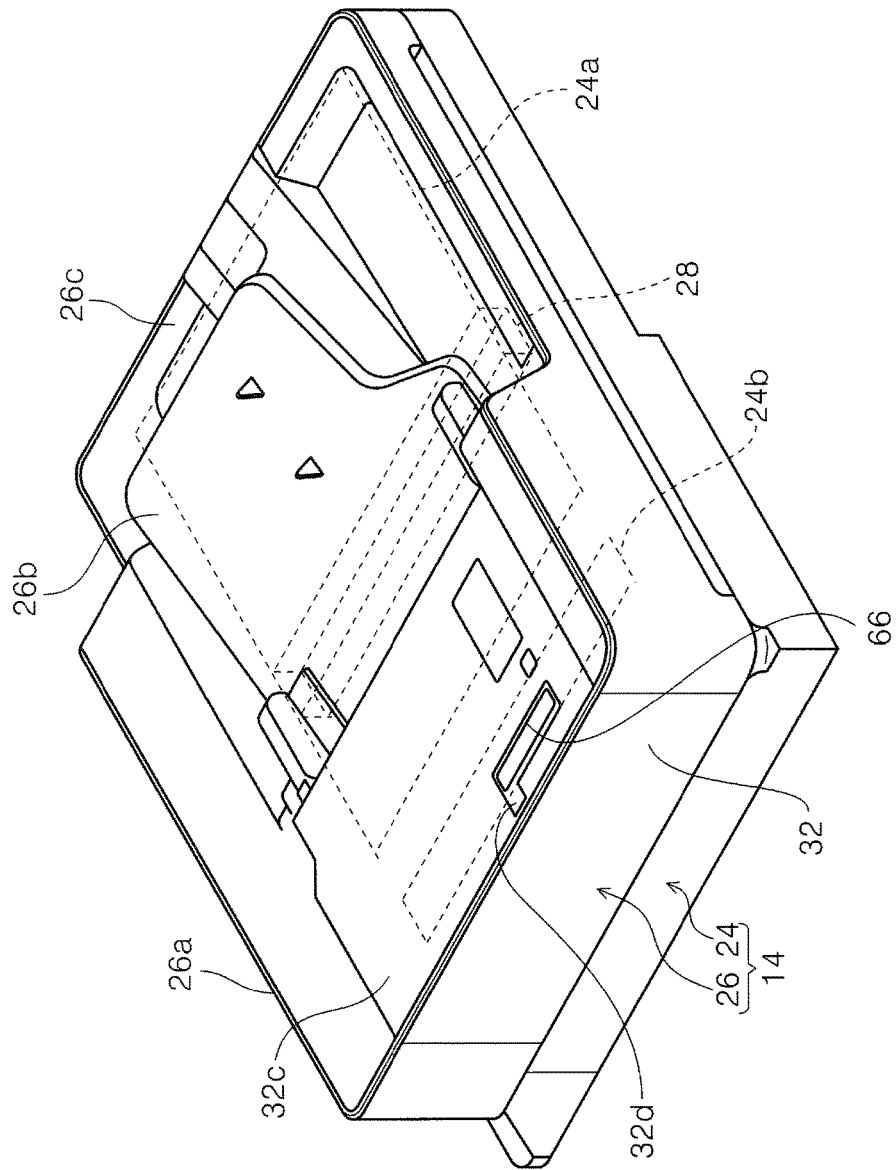
FIG. 2 is an external perspective view illustrating a scanner according to the disclosure, which is in a state where a cover thereof is closed.
Figure 3:
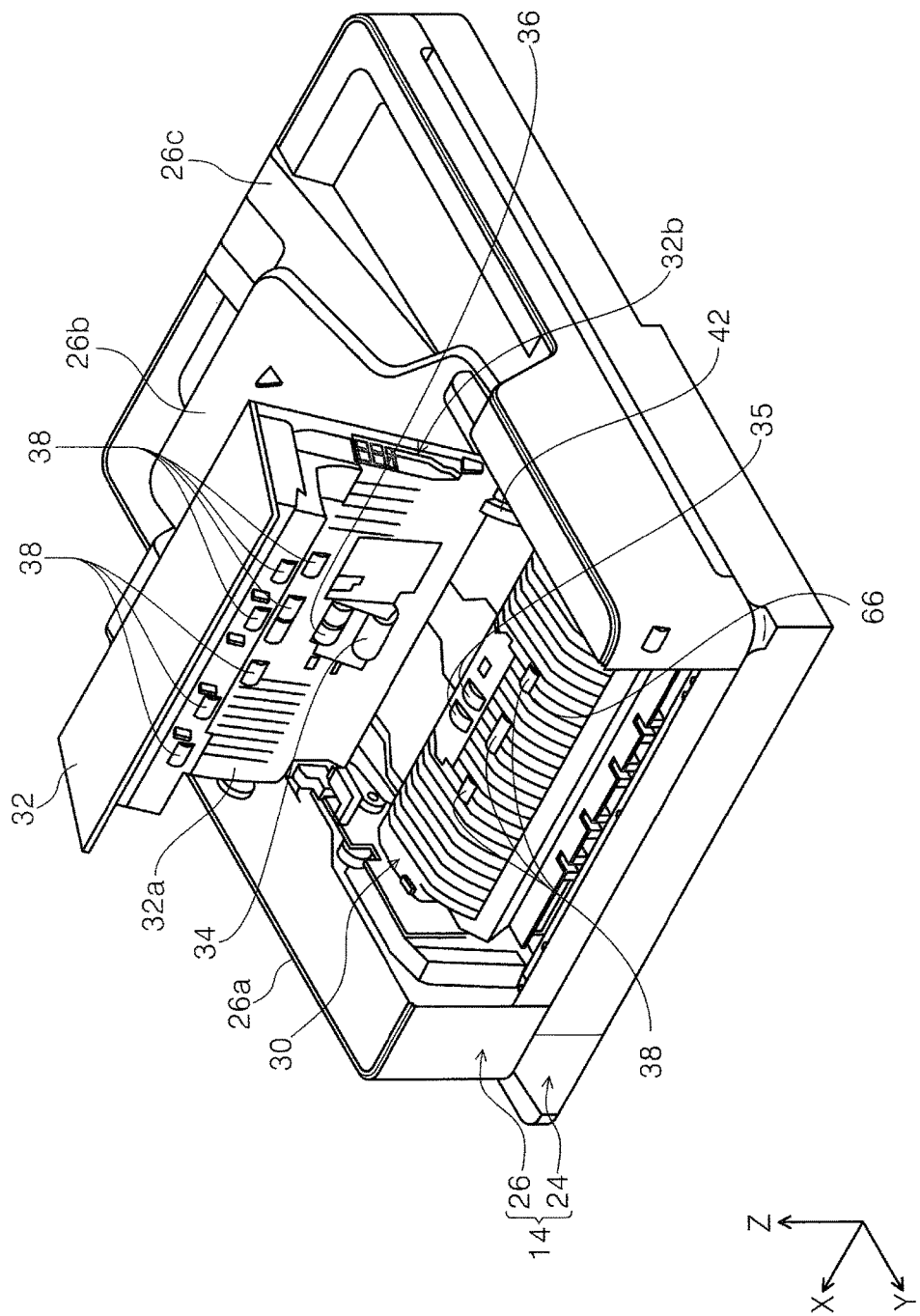
FIG. 3 is an external perspective view illustrating the scanner according to the disclosure, which is in a state where the cover is open and a portion of a medium transporting path is exposed.
Figure 4:
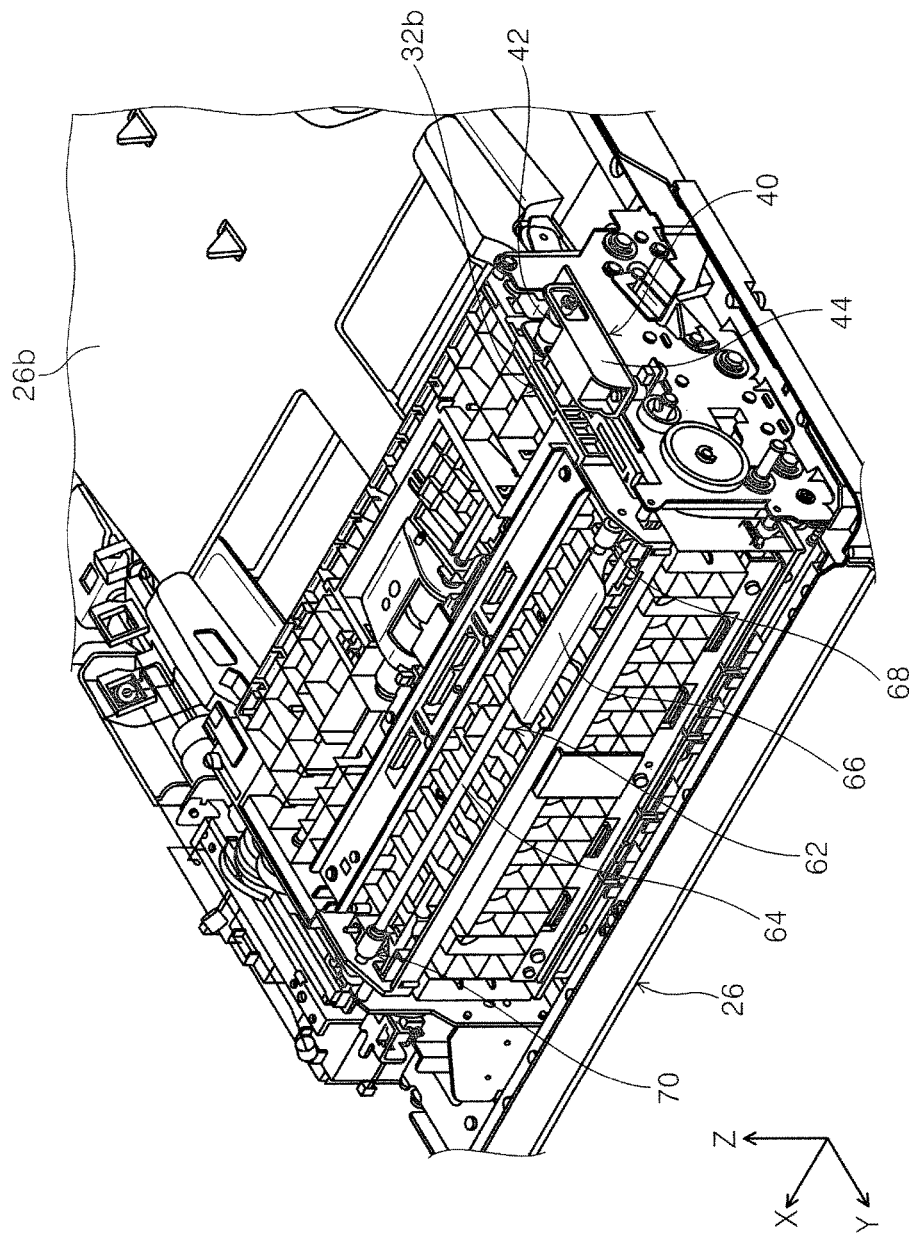
FIG. 4 is a perspective view illustrating a state where the exterior of the scanner according to the disclosure is removed.
Figure 5:
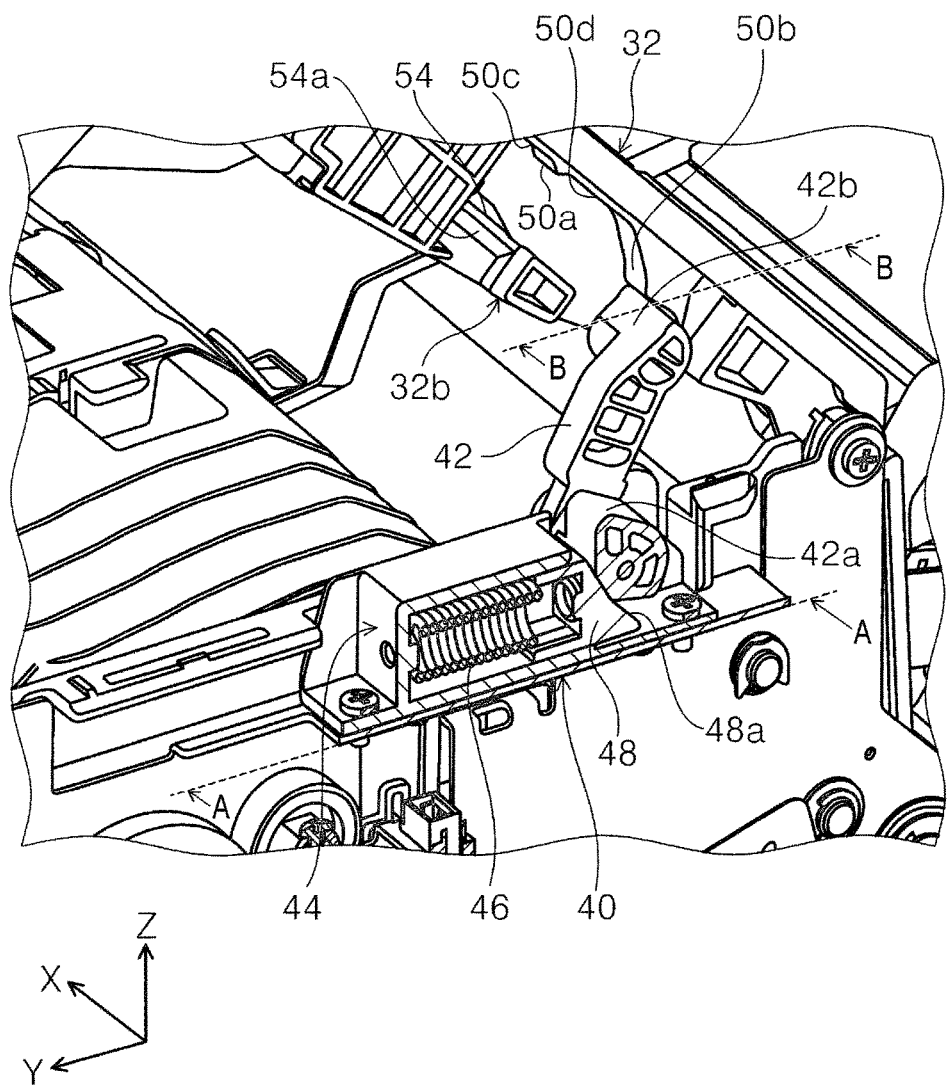
FIG. 5 is a perspective view illustrating a holding unit that holds a state where the cover of the scanner according to the disclosure is open.
Figure 6:
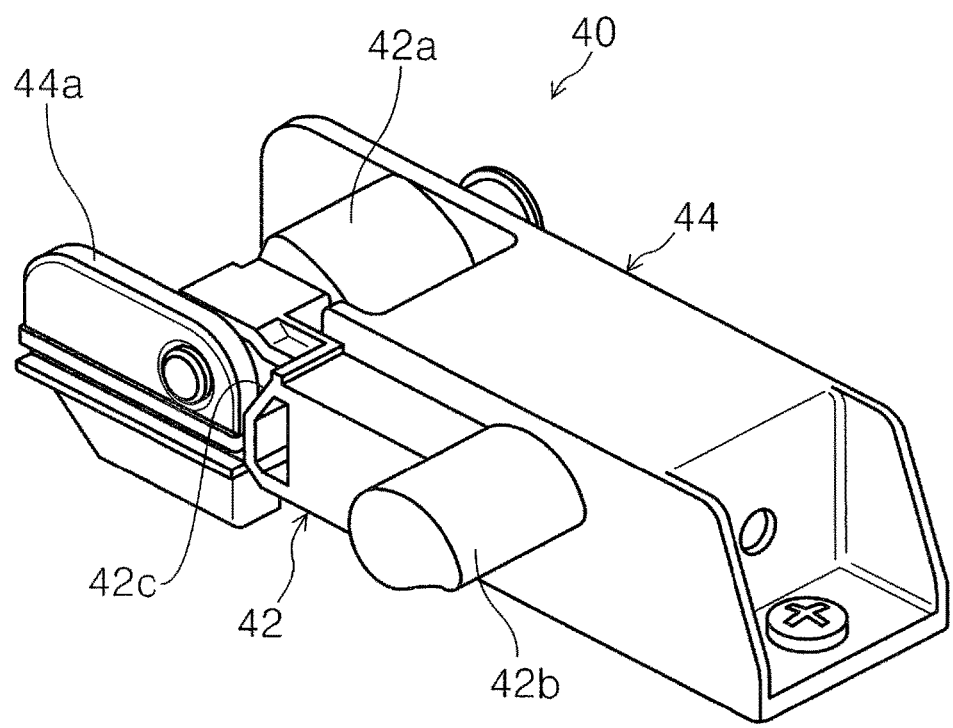
FIG. 6 is a perspective view illustrating the holding unit in a state where a rotation member is closed.
Figure 7:
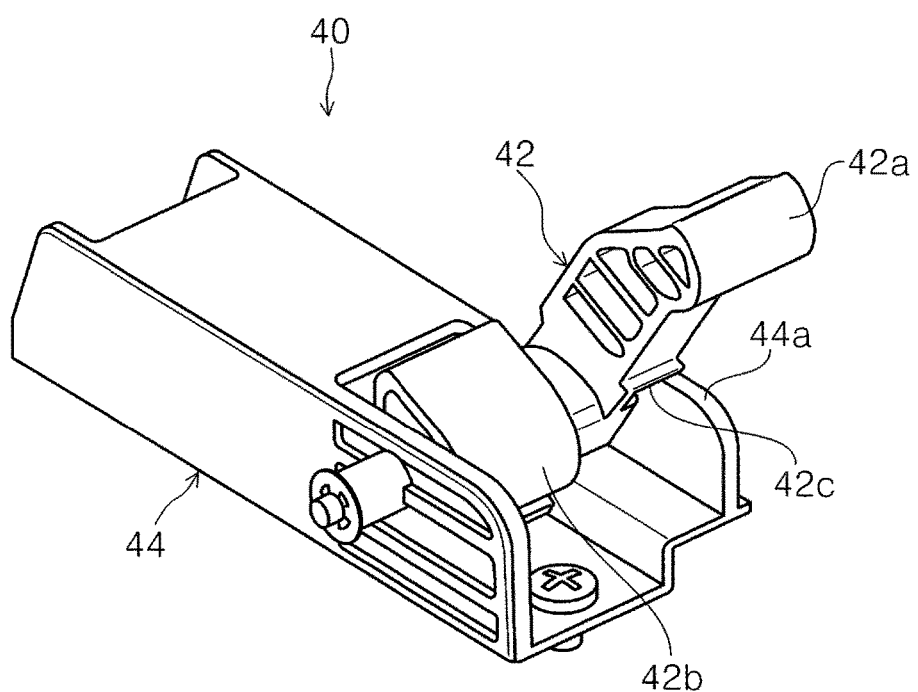
FIG. 7 is a perspective view illustrating the holding unit in a state where the rotation member is open.
Figure 7:
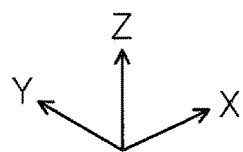
Figure 8:
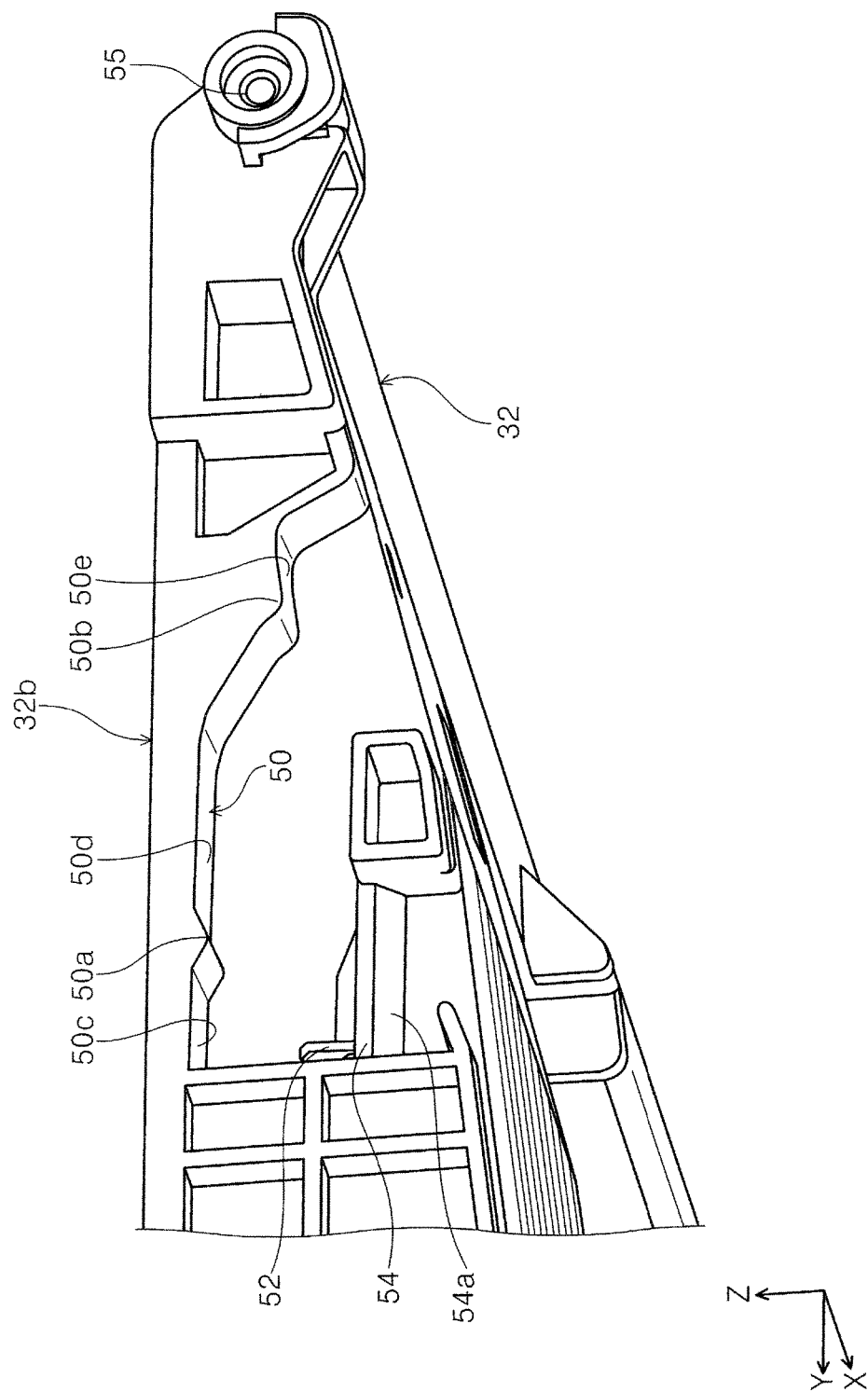
FIG. 8 is a perspective view illustrating a sliding contact surface of the cover.

FIG. 1 is an external perspective view illustrating a printer according to the disclosure, FIG. 2 is an external perspective view illustrating a scanner according to the disclosure, which is in a state where a cover thereof is closed, FIG. 3 is an external perspective view illustrating the scanner according to the disclosure, which is in a state where the cover is open and a portion of a medium transporting path is exposed, FIG. 4 is a perspective view illustrating a state where the exterior of the scanner according to the disclosure is removed, FIG. 5 is a perspective view illustrating a holding unit that holds a state where the cover of the scanner according to the disclosure is open, FIG. 6 is a perspective view illustrating the holding unit in a state where a rotation member is closed, FIG. 7 is a perspective view illustrating the holding unit in a state where the rotation member is open, FIG. 8 is a perspective view illustrating a sliding contact surface of the cover, and FIG. 9 is a side sectional view illustrating a relationship between a cam and a cam follower and a relationship between a supporting portion and the sliding contact surface in a state where the cover is closed.

Figure 10A:
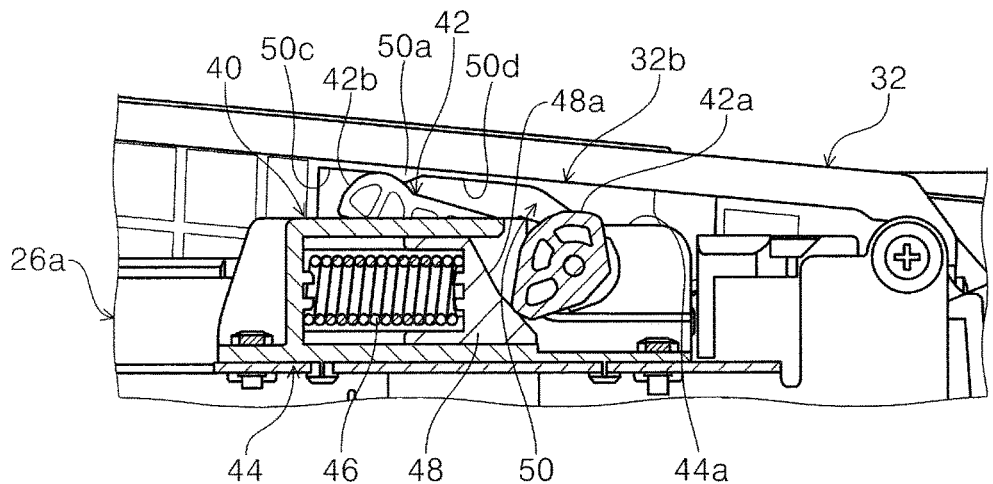
FIGS. 10A and 10B are side sectional views illustrating a relationship between the cam and the cam follower and a relationship between the supporting portion and the sliding contact surface when the cover is opened with respect to the main body portion.
Figure 10B:
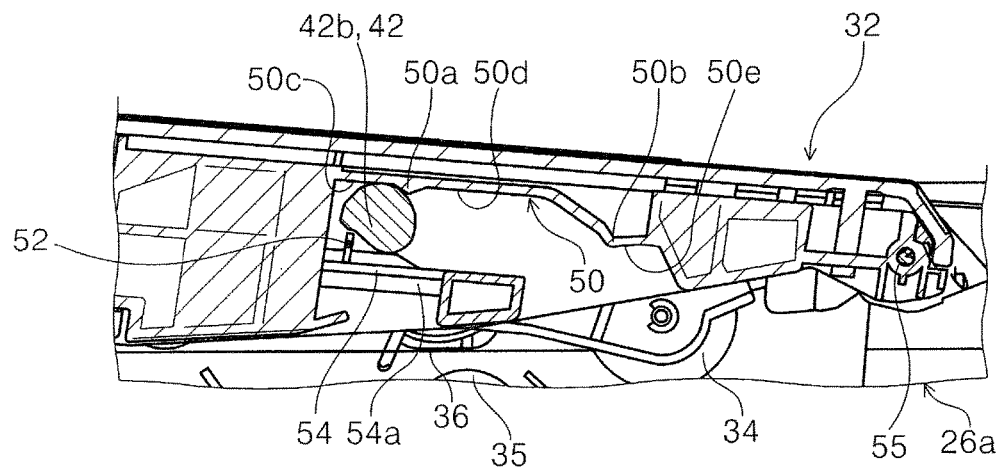
Figure 11A:
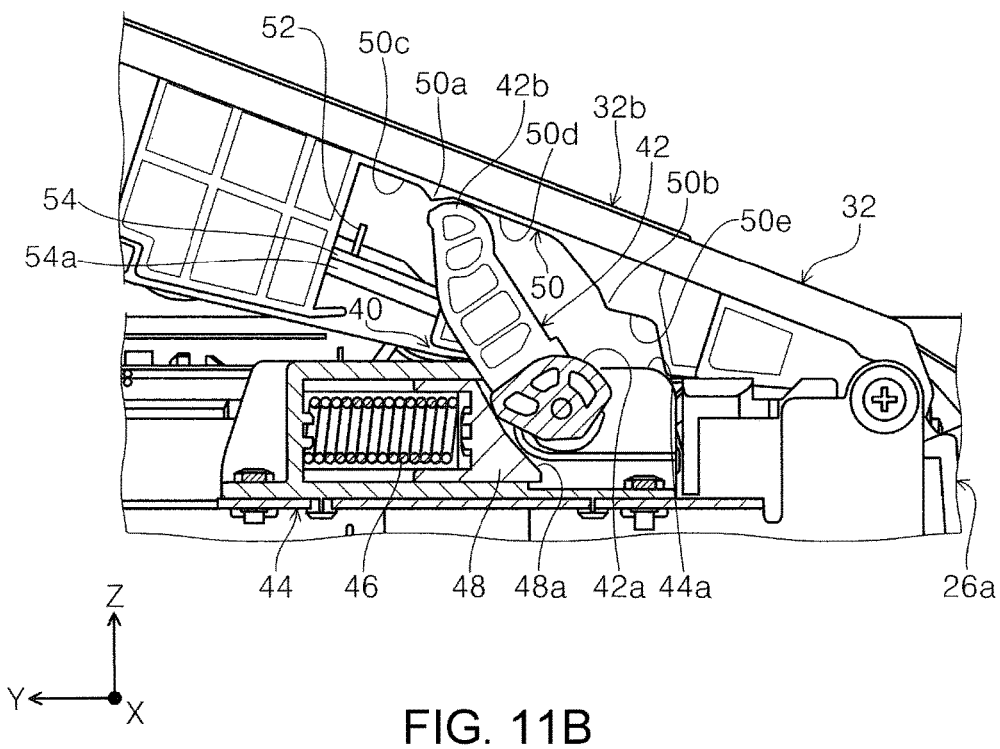
FIGS. 11A and 11B are side sectional views illustrating a relationship between the cam and the cam follower and a relationship between the supporting portion and the sliding contact surface when the cover is opened with respect to the main body portion.
Figure 11B:
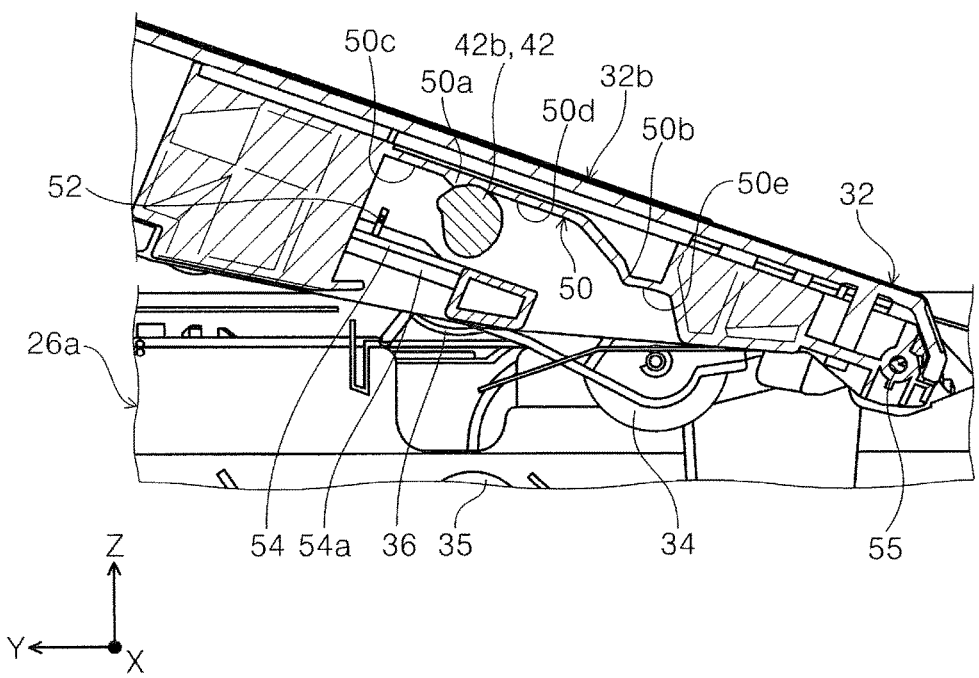
Figure 12A:
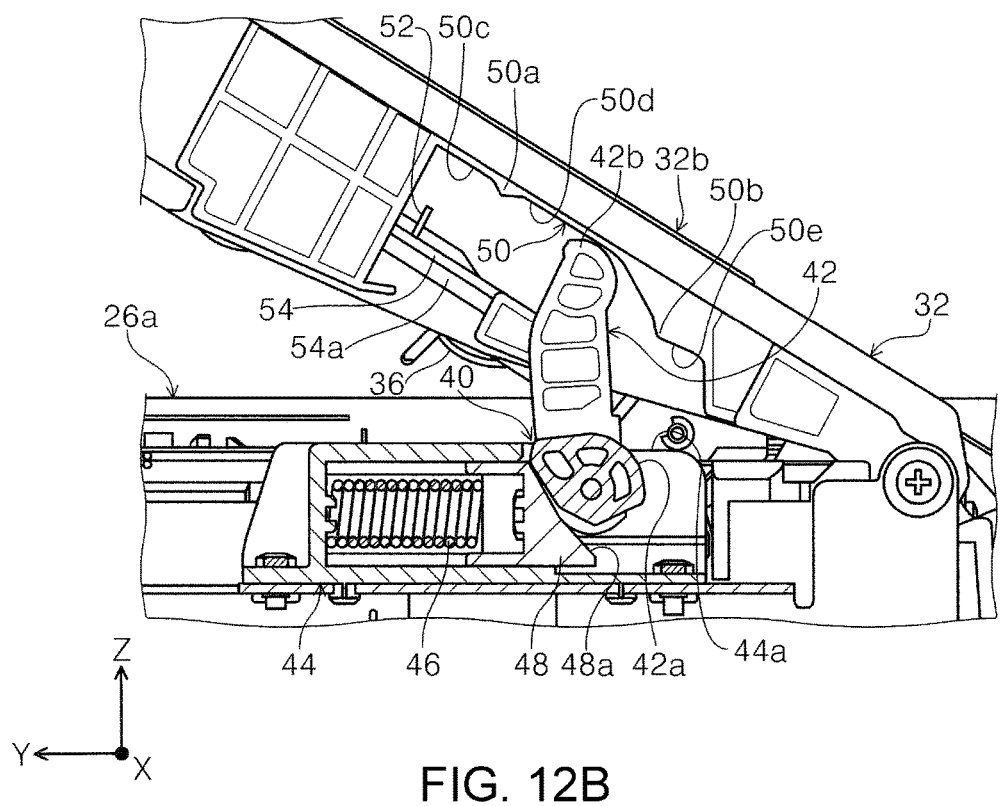
FIGS. 12A and 12B are side sectional views illustrating a relationship between the cam and the cam follower and a relationship between the supporting portion and the sliding contact surface when the cover is opened with respect to the main body portion.
Figure 12B:
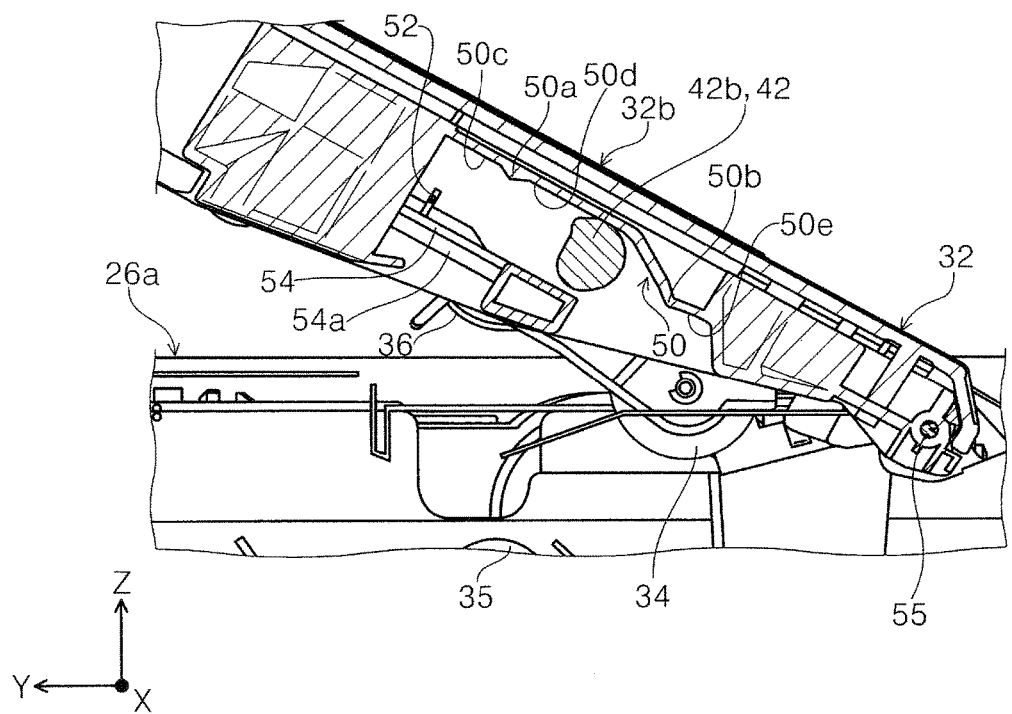
Figure 13A:
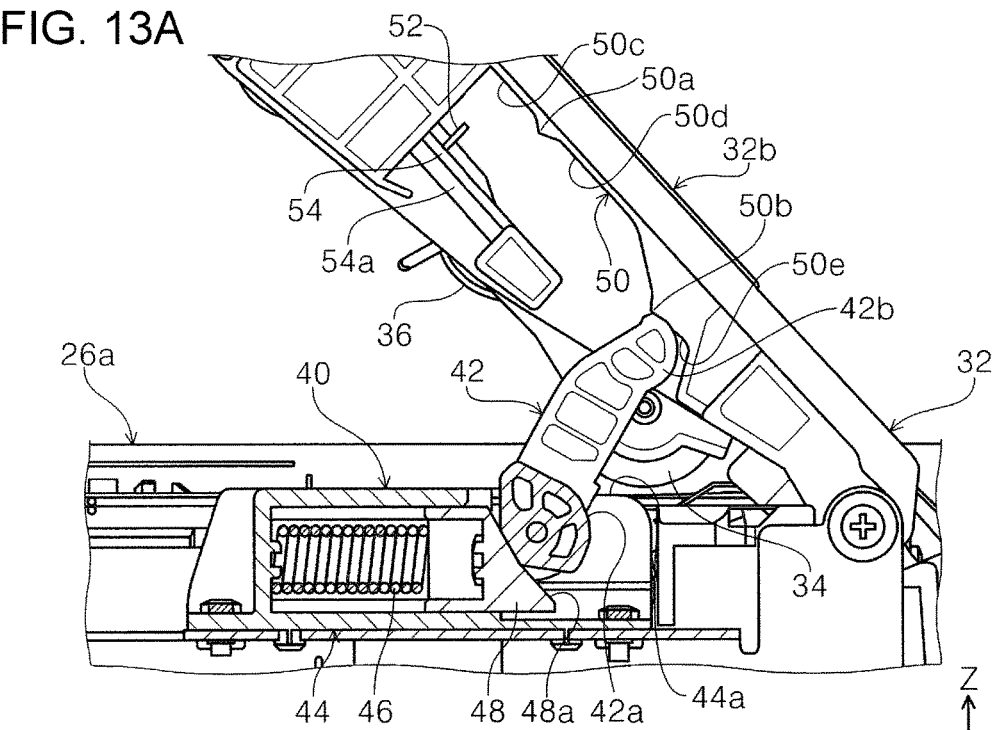
FIGS. 13A and 13B are side sectional views illustrating a relationship between the cam and the cam follower and a relationship between the supporting portion and the sliding contact surface when the cover is opened with respect to the main body portion.
Figure 13B:
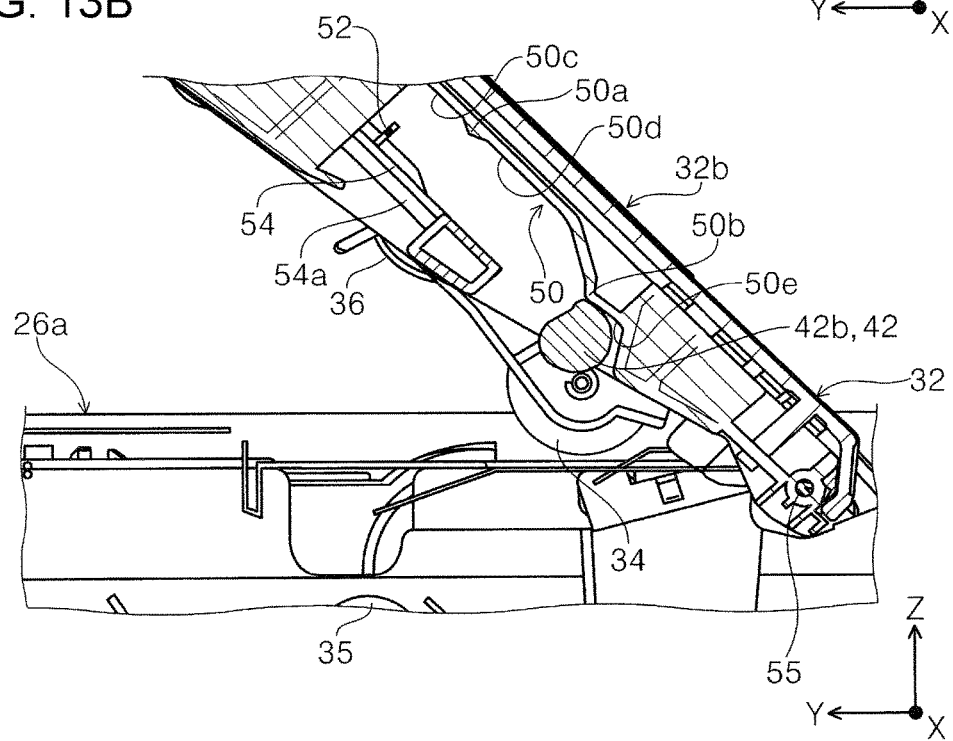
Figure 14A:
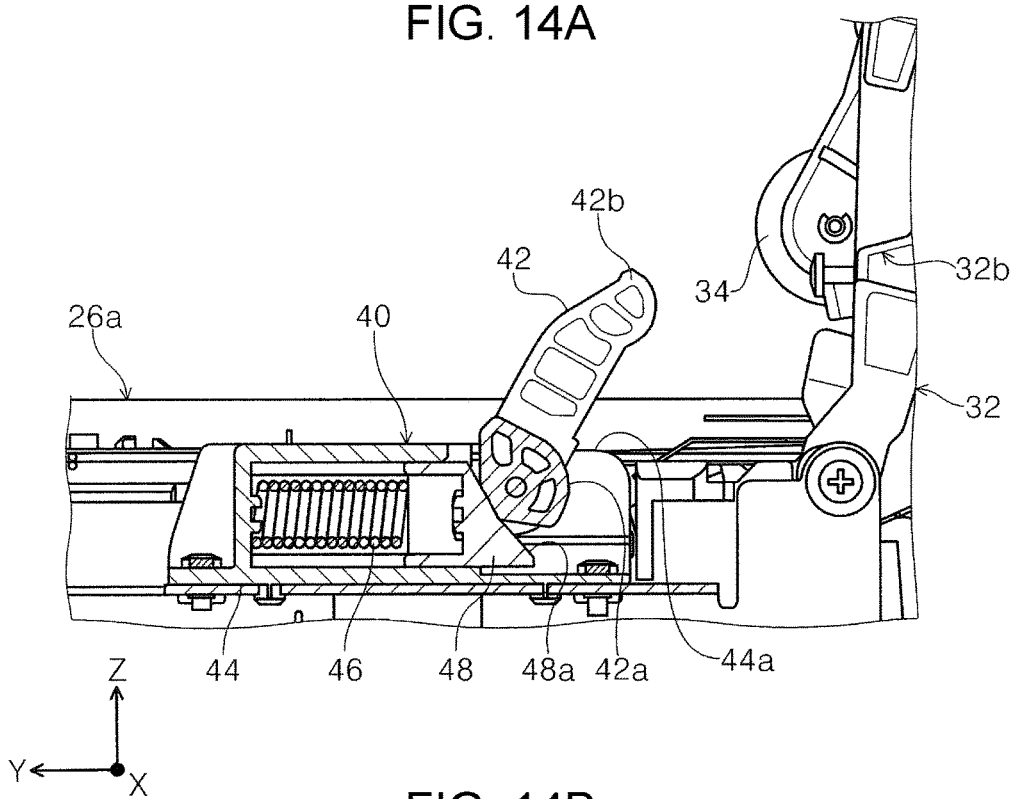
FIGS. 14A and 14B are side sectional views illustrating a relationship between the cam and the cam follower and a relationship between the supporting portion and the sliding contact surface when the cover is opened with respect to the main body portion.
Figure 14B:
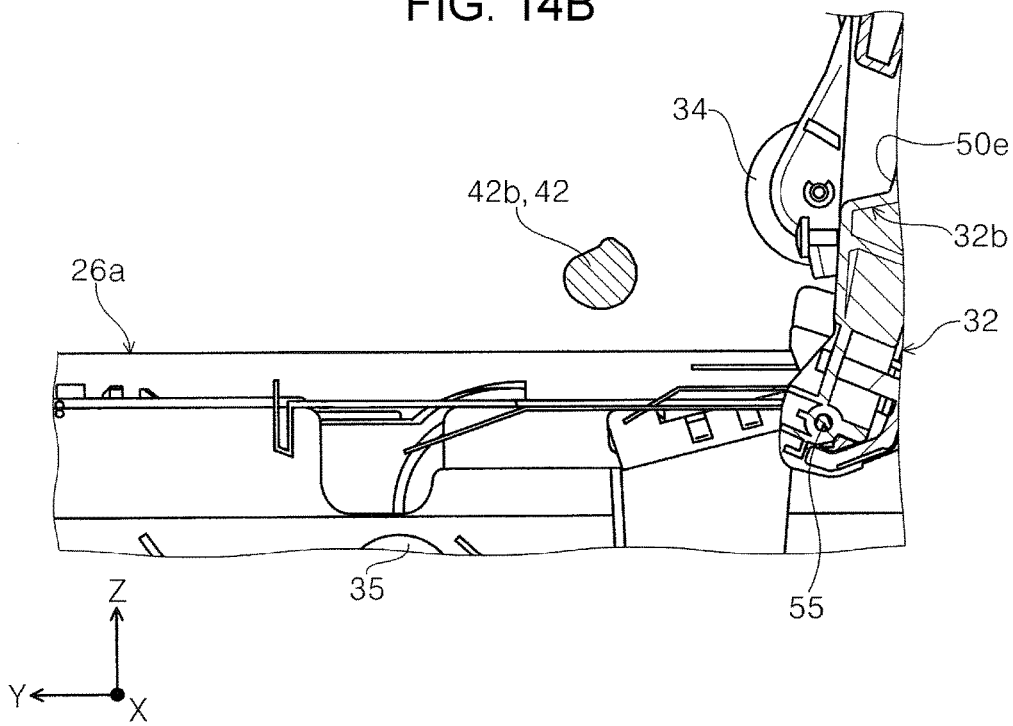
Figure 15:
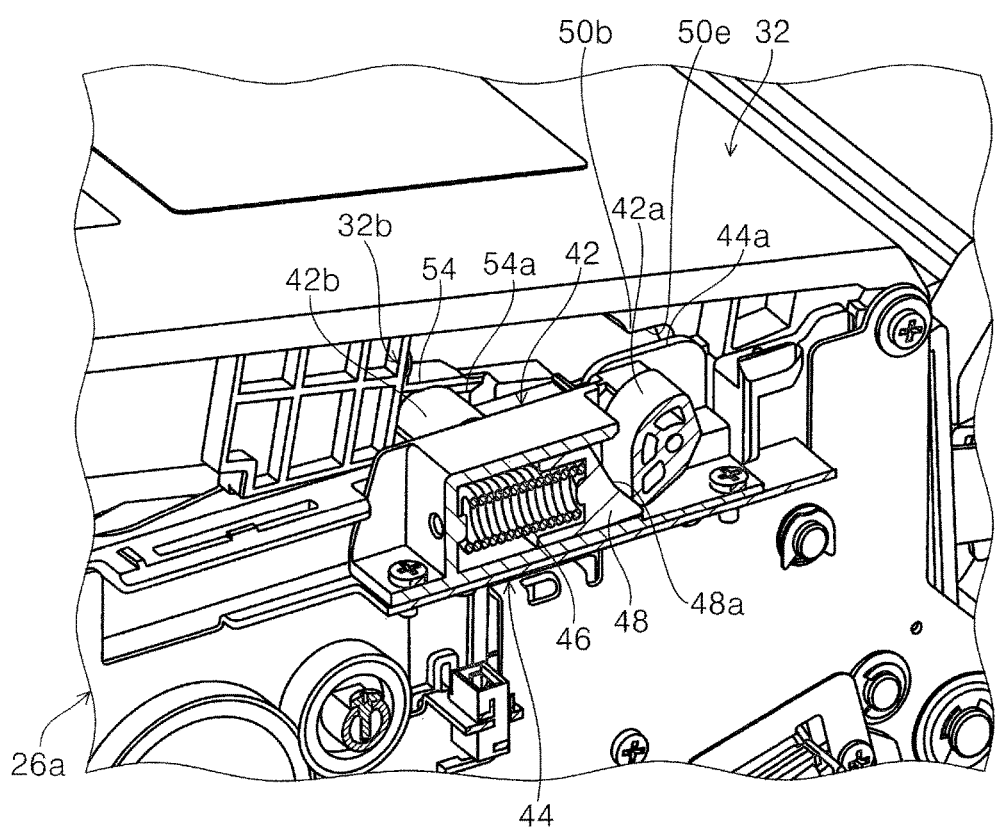
FIG. 15 is a perspective view illustrating the holding unit when the cover is opened and the cover is closed from a state where the rotation member falls down.
Figure 15:
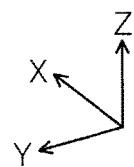
Figure 16:
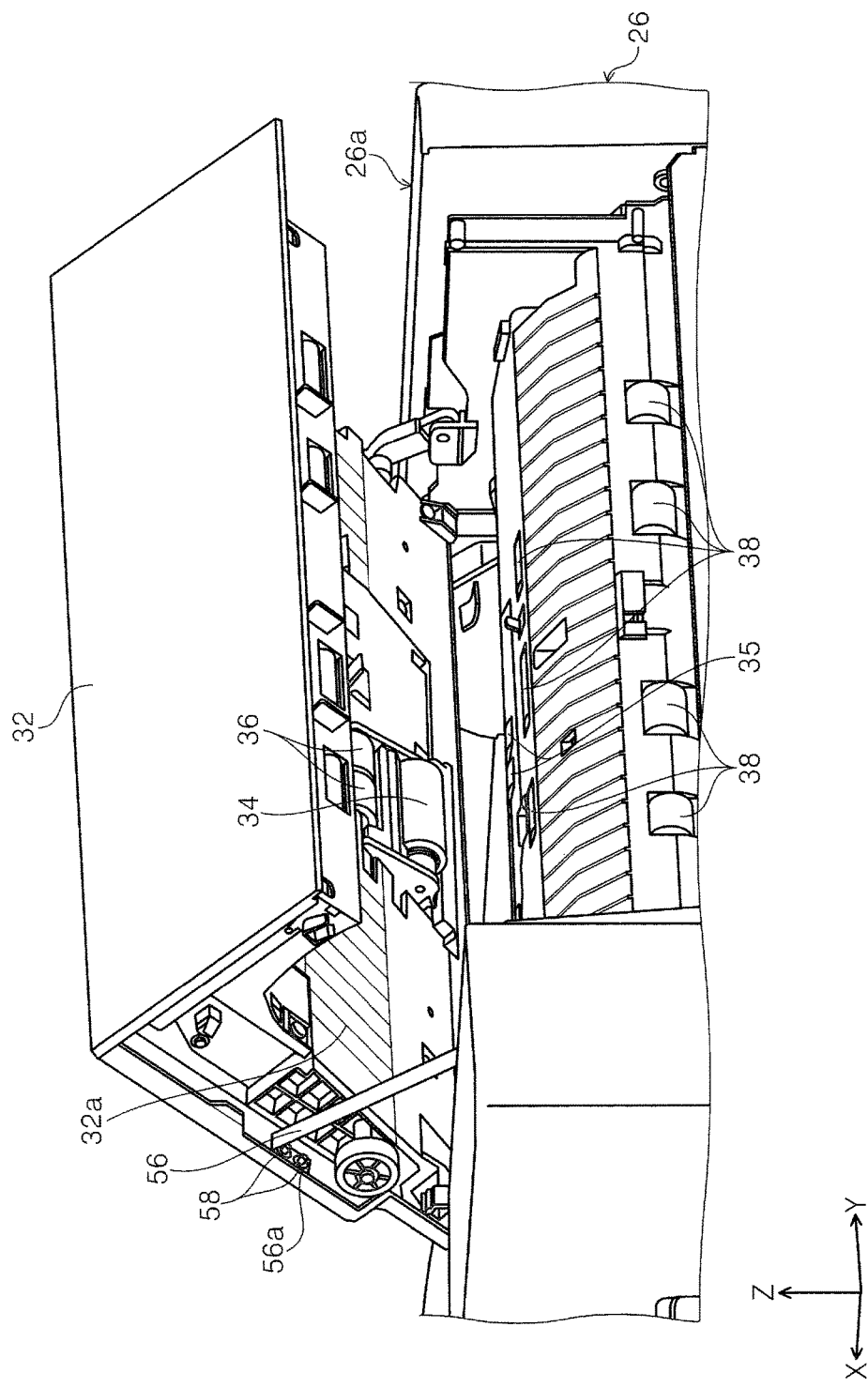
FIG. 16 is a perspective view illustrating a state where the opening of the cover is regulated by a regulation belt.
Figure 17:
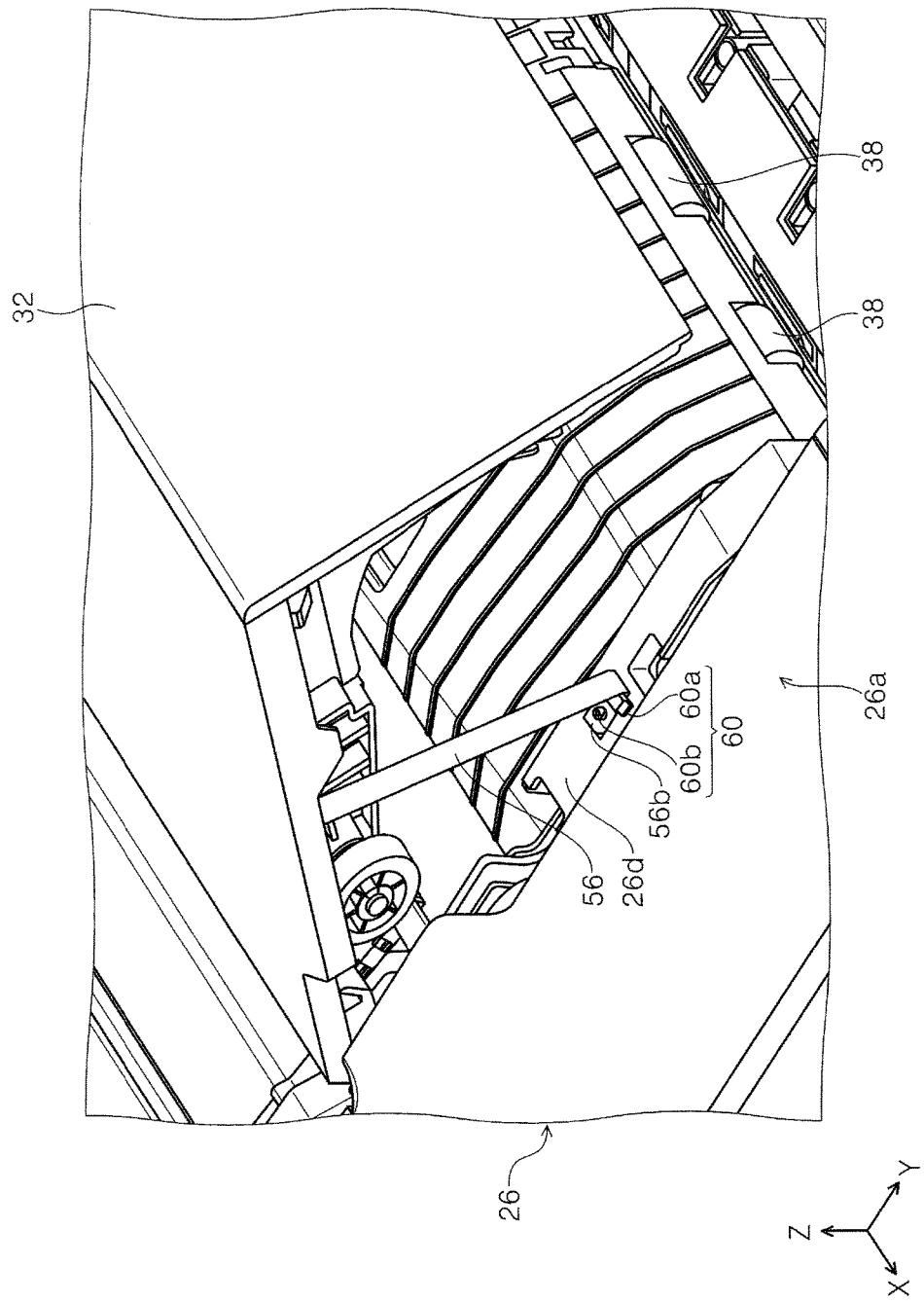
FIG. 17 is a perspective view illustrating an attaching portion on a main body portion side of the regulation belt.
Figure 18:
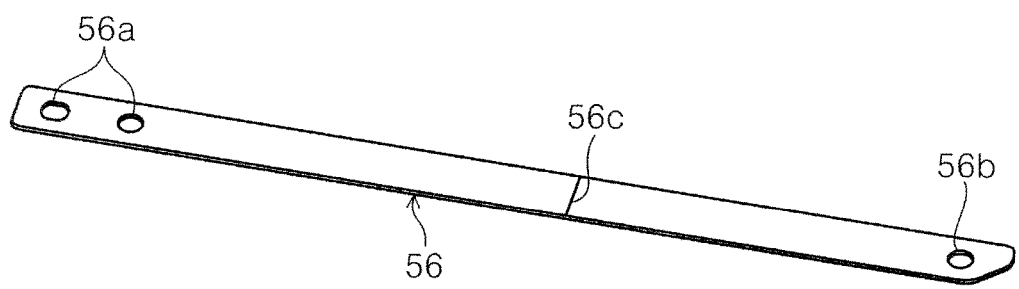
FIG. 18 is a perspective view illustrating the regulation belt.

FIG. 10 is a side sectional view illustrating a relationship between the cam and the cam follower and a relationship between the supporting portion and the sliding contact surface when the cover is opened with respect to the main body portion, FIG. 11 is a side sectional view illustrating a relationship between the cam and the cam follower and a relationship between the supporting portion and the sliding contact surface when the cover is opened with respect to the main body portion, FIG. 12 is a side sectional view illustrating a relationship between the cam and the cam follower and a relationship between the supporting portion and the sliding contact surface when the cover is opened with respect to the main body portion, FIG. 13 is a side sectional view illustrating a relationship between the cam and the cam follower and a relationship between the supporting portion and the sliding contact surface when the cover is opened with respect to the main body portion, FIG. 14 is a side sectional view illustrating a relationship between the cam and the cam follower and a relationship between the supporting portion and the sliding contact surface in a state where the cover completely is open, FIG. 15 is a perspective view illustrating the holding unit when the cover is opened and the cover is closed from a state where the rotation member falls down, FIG. 16 is a perspective view illustrating a state where the opening of the cover is regulated by a regulation belt, FIG. 17 is a perspective view illustrating an attaching portion on a main body side of the regulation belt, and FIG. 18 is a perspective view illustrating the regulation belt.

Figure 19:
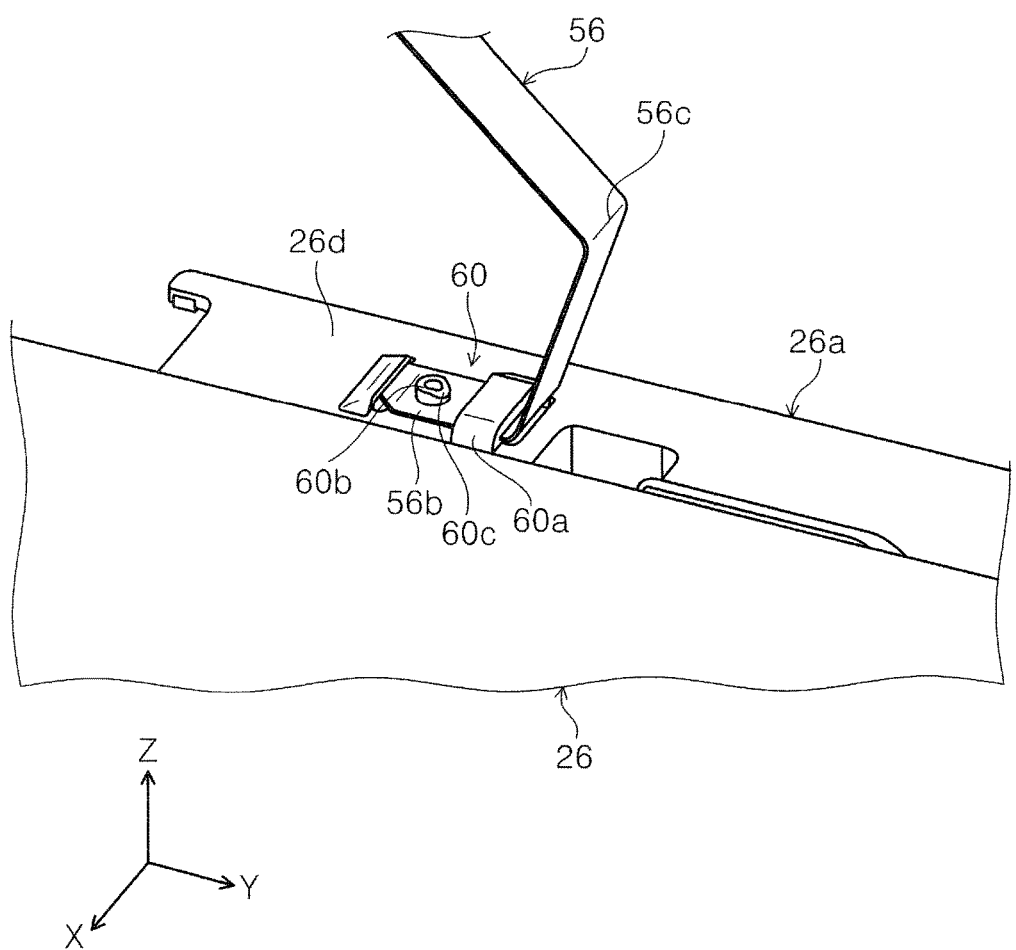
FIG. 19 is a perspective view illustrating a state where the regulation belt is removed from the attaching portion.
Figure 20:
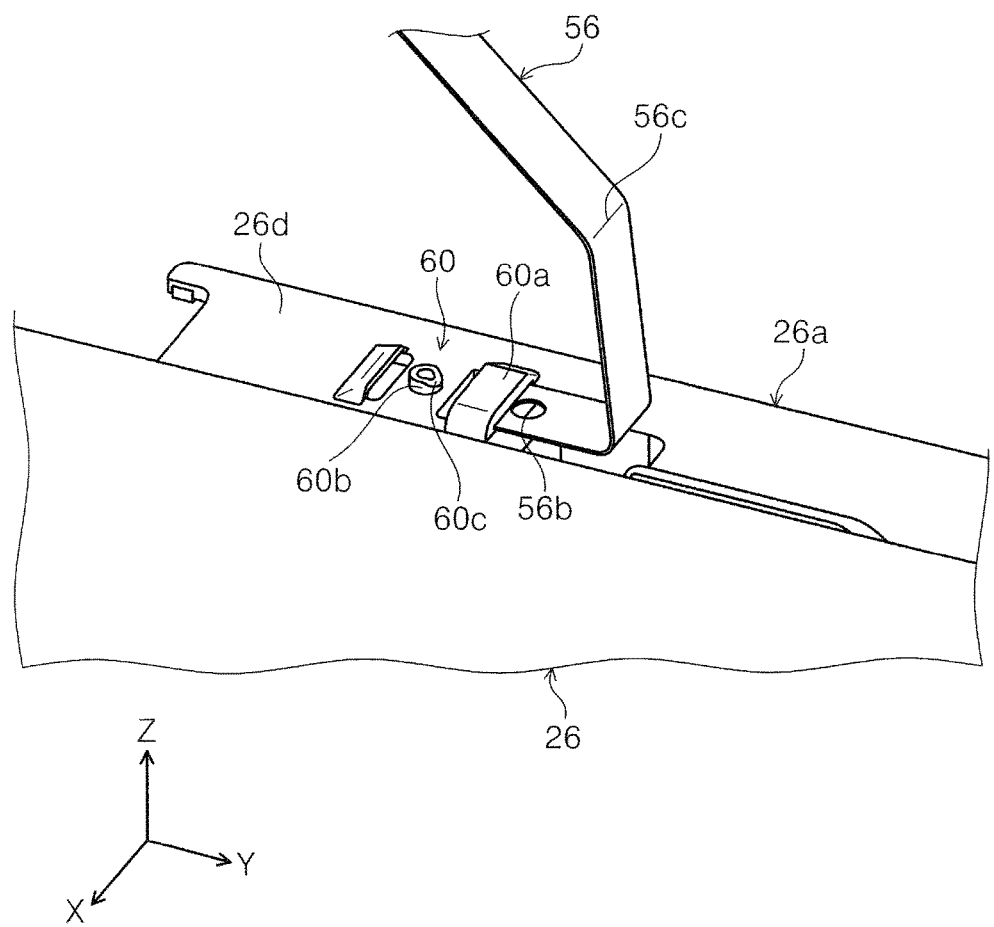
FIG. 20 is a perspective view illustrating a state where the regulation belt is removed from the attaching portion.
Figure 21:
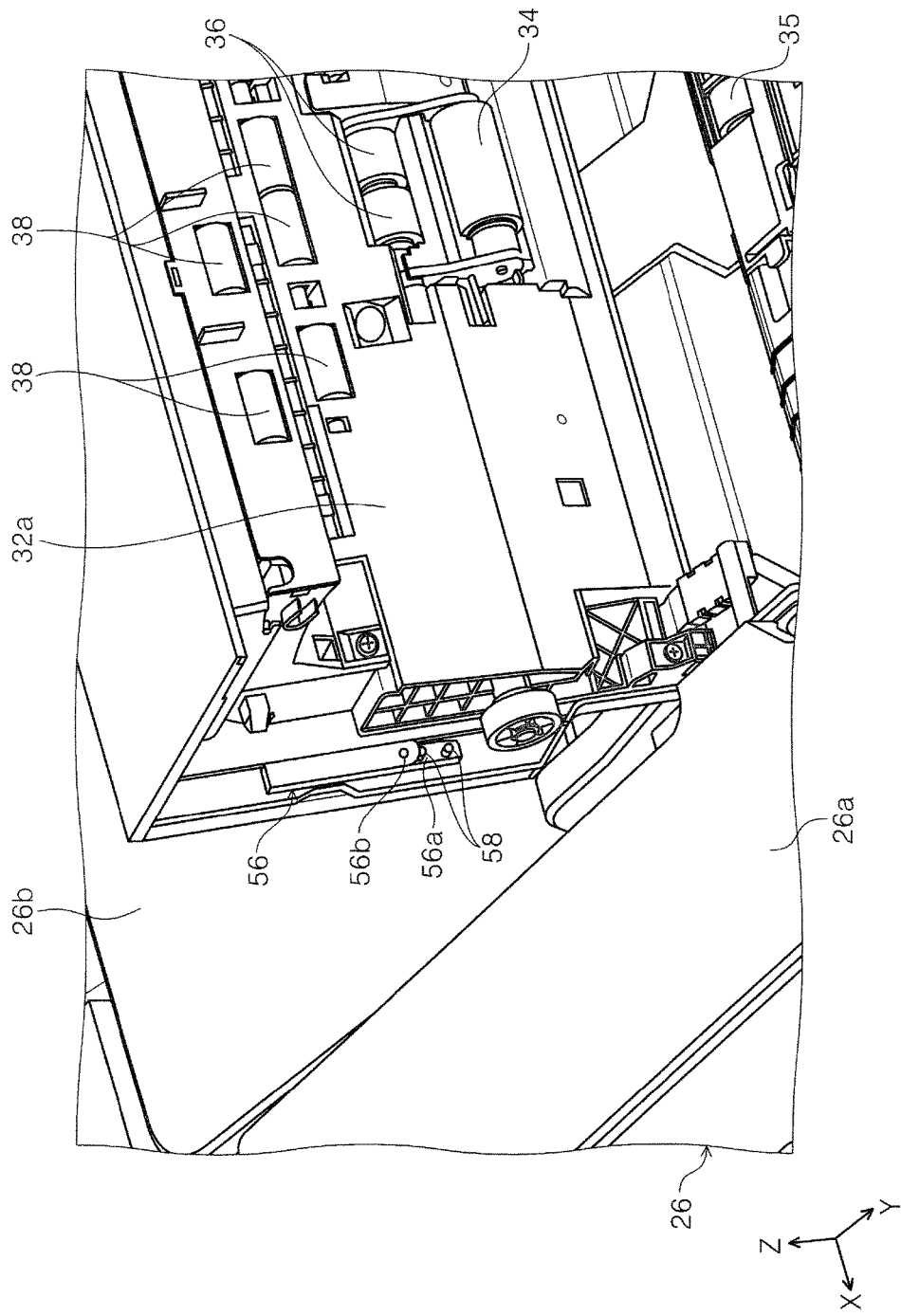
FIG. 21 is a perspective view illustrating a state where the regulation belt is removed from the attaching portion and folded on a cover side.
Figure 22:
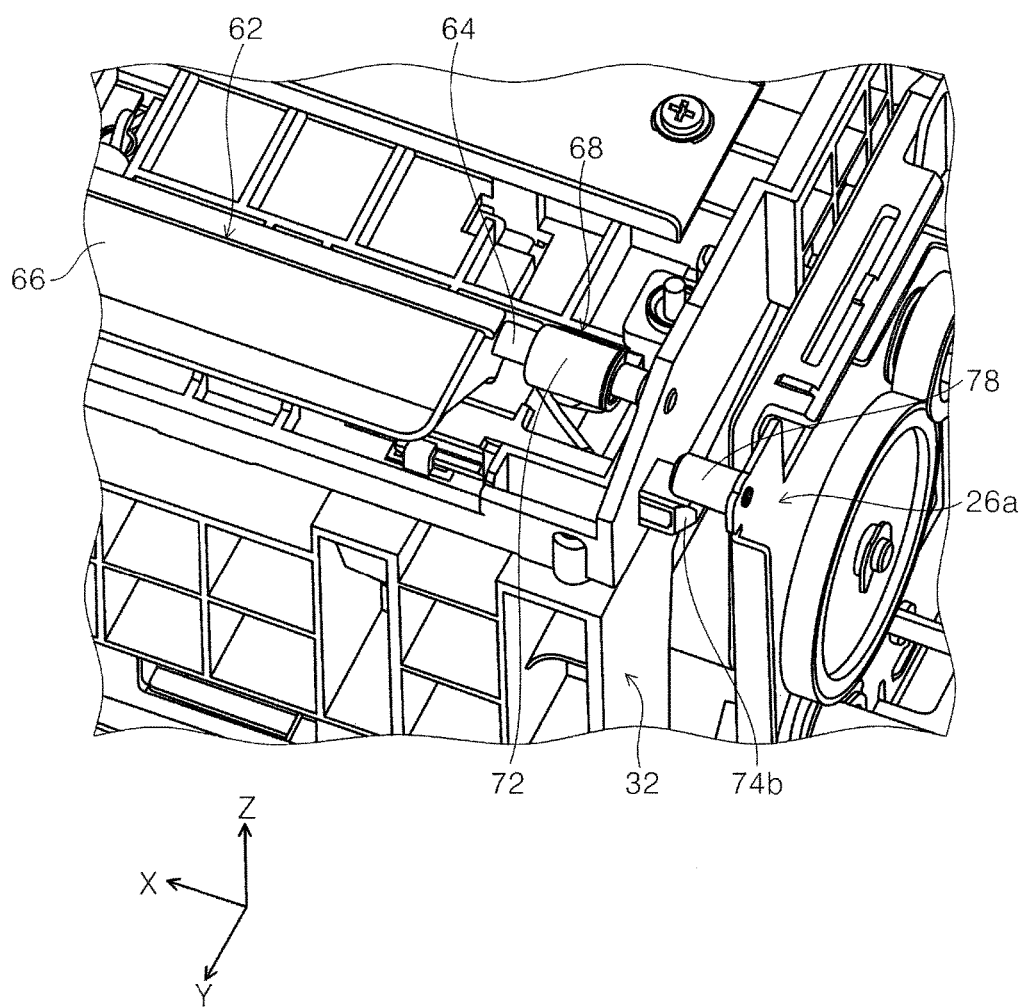
FIG. 22 is a perspective view illustrating a first locking portion of a locking unit of the cover.
Figure 23:
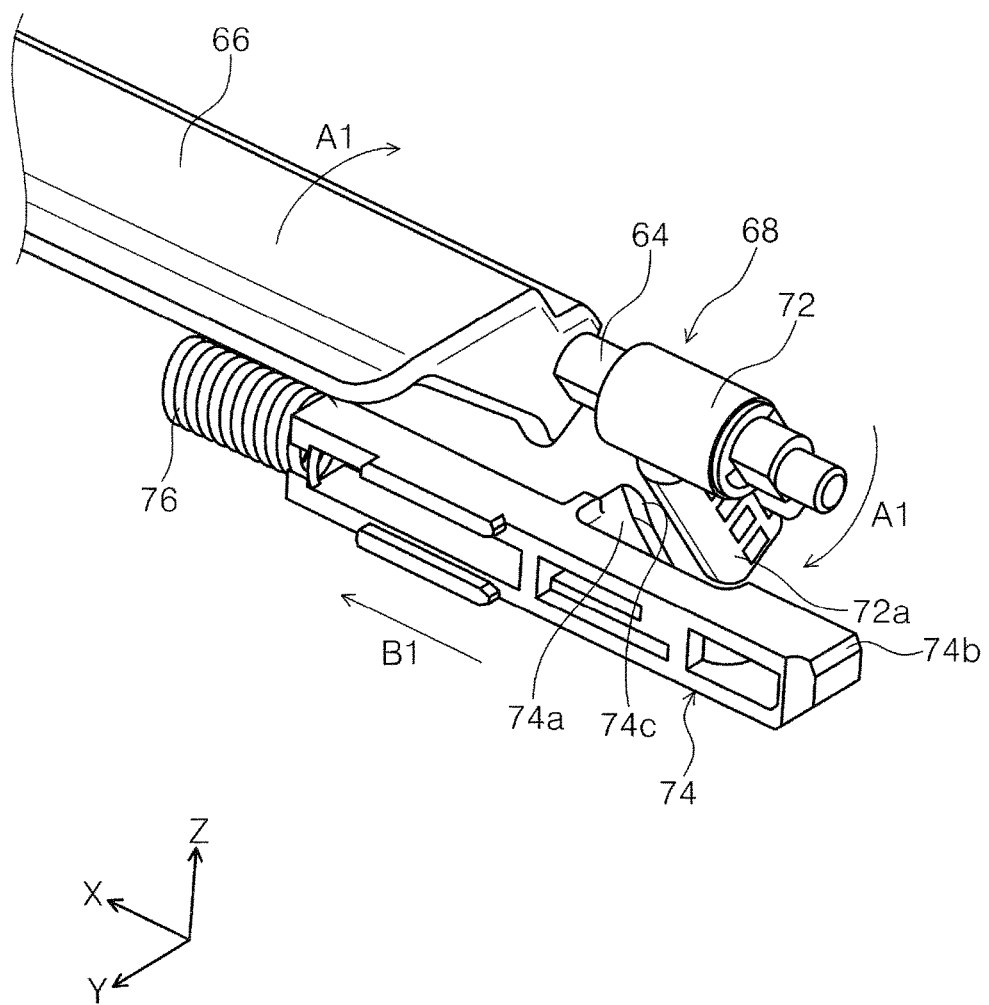
FIG. 23 is a perspective view illustrating the first locking portion.
Figure 24:
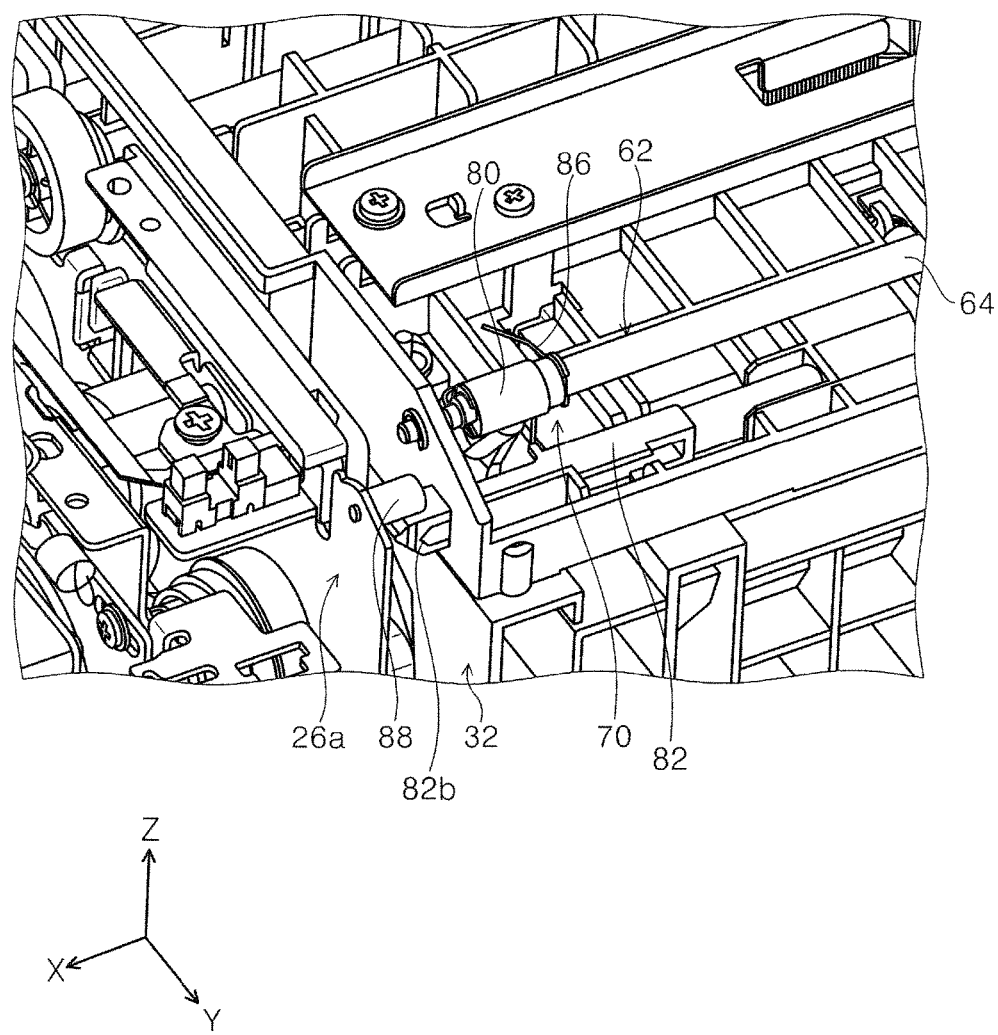
FIG. 24 is a perspective view illustrating a second locking portion of the locking unit of the cover.
Figure 25:
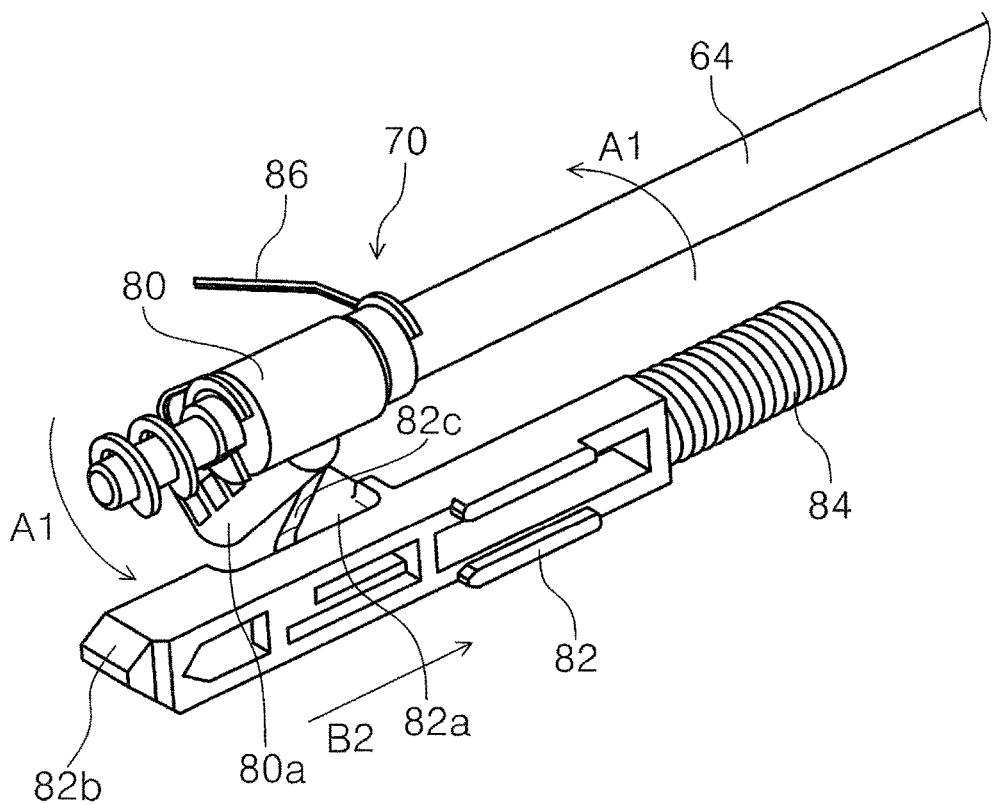
FIG. 25 is a perspective view illustrating a second locking portion.
Figure 26:
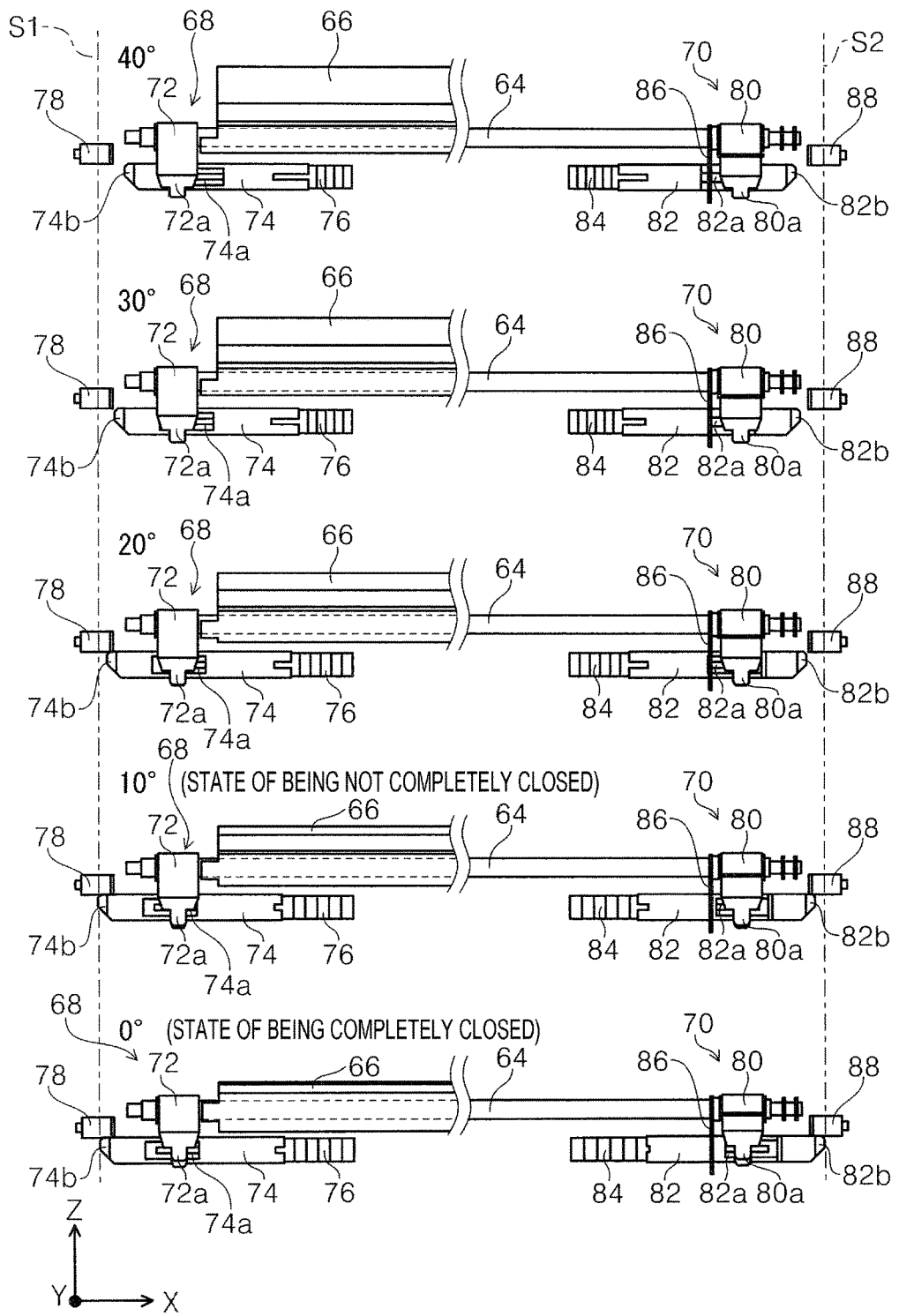
FIG. 26 is a view illustrating changes in states of the first locking portion and the second locking portion when the cover is closed as viewed from an upstream side in a transporting direction.
Figure 27:
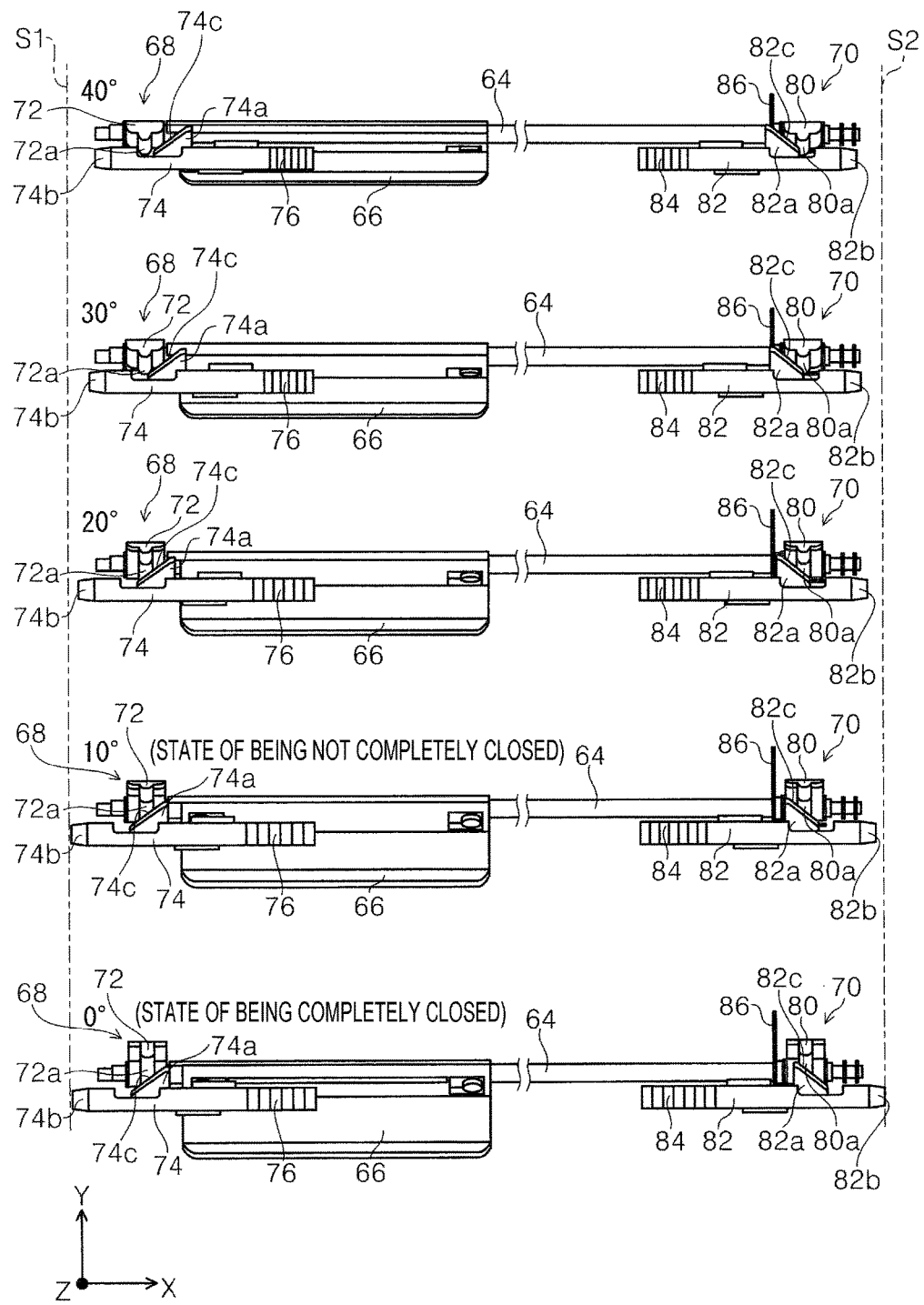
FIG. 27 is a view illustrating changes in the states of the first locking portion and the second locking portion when the cover is closed as viewed from a lower side in a device height direction.

FIG. 19 is a perspective view illustrating a state where the regulation belt is removed from the attaching portion, FIG. 20 is a perspective view illustrating a state where the regulation belt is removed from the attaching portion, FIG. 21 is a perspective view illustrating a state where the regulation belt is removed from the attaching portion and folded on a cover side, FIG. 22 is a perspective view illustrating a first locking portion of a locking unit of the cover, FIG. 23 is a perspective view illustrating the first locking portion, FIG. 24 is a perspective view illustrating a second locking portion of the locking unit of the cover, FIG. 25 is a perspective view illustrating a second locking portion, FIG. 26 is a view illustrating changes in states of the first locking portion and the second locking portion when the cover is closed as viewed from an upstream side in a transporting direction, FIG. 27 is a view illustrating changes in the states of the first locking portion and the second locking portion when the cover is closed as viewed from a lower side in a device height direction.

Figure 28:
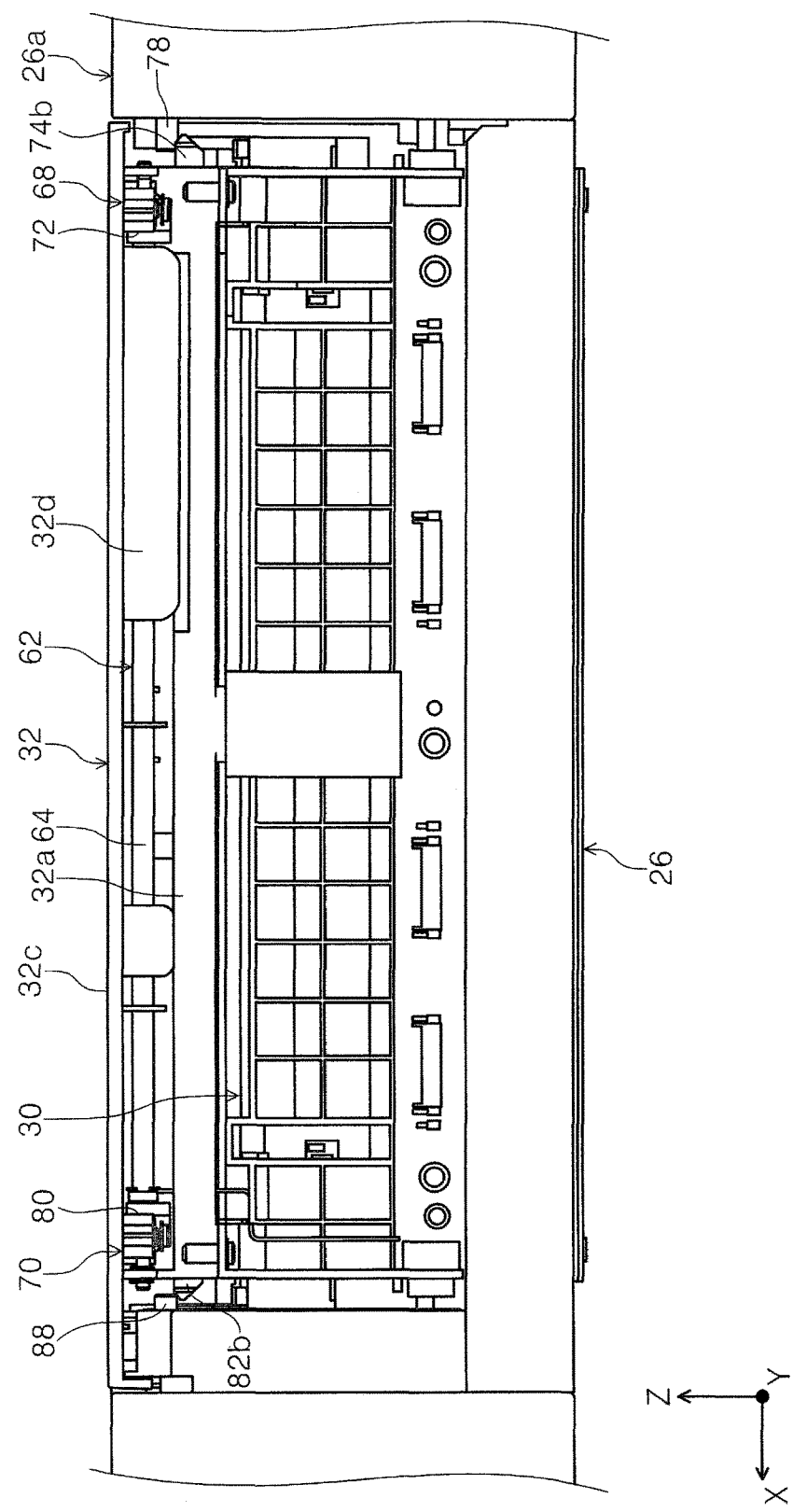
FIG. 28 is a side view in a state where the cover completely is closed with respect to the main body portion.
Figure 29:
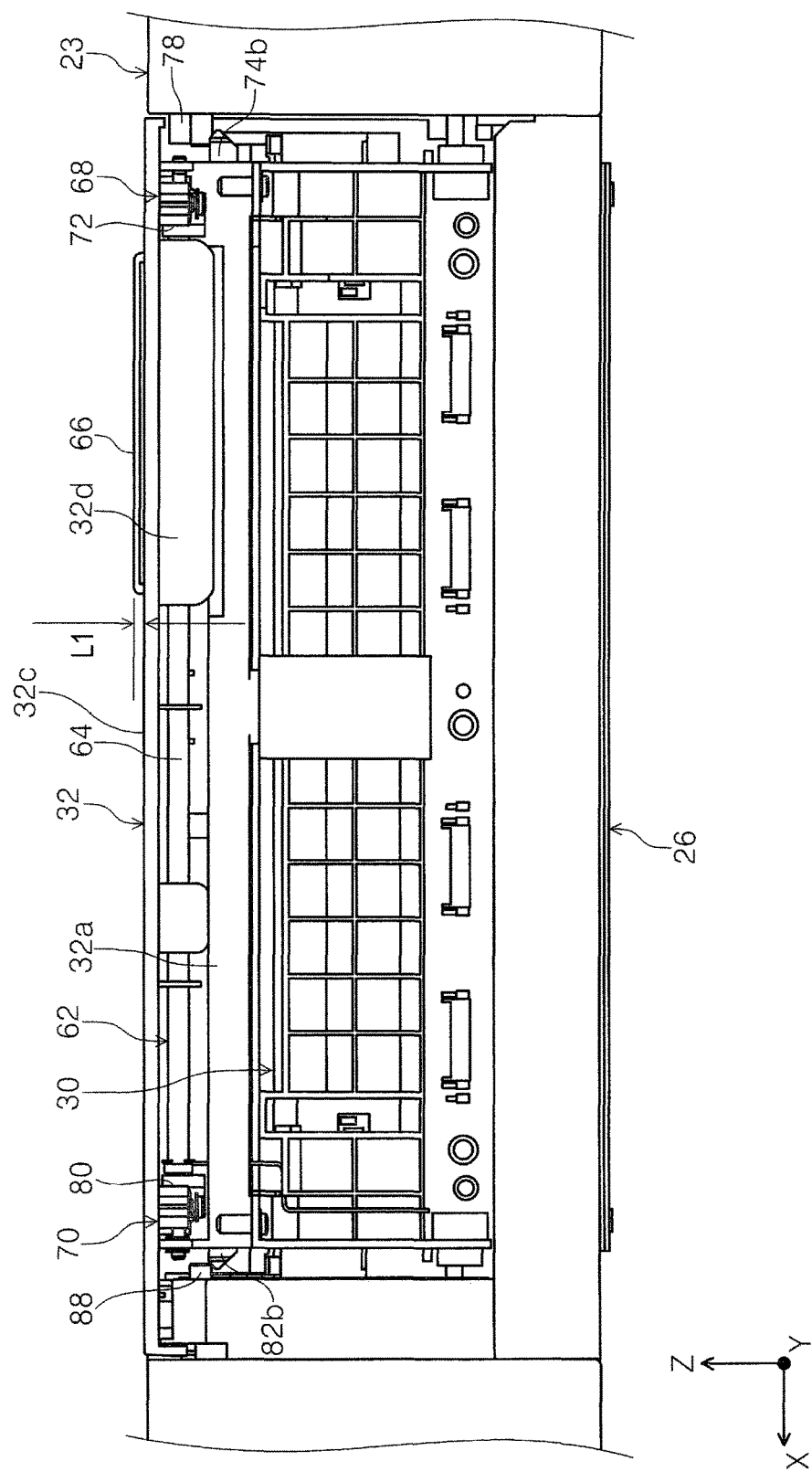
FIG. 29 is a side view in a state where the cover is not completely closed with respect to the main body portion.
Figure 30:
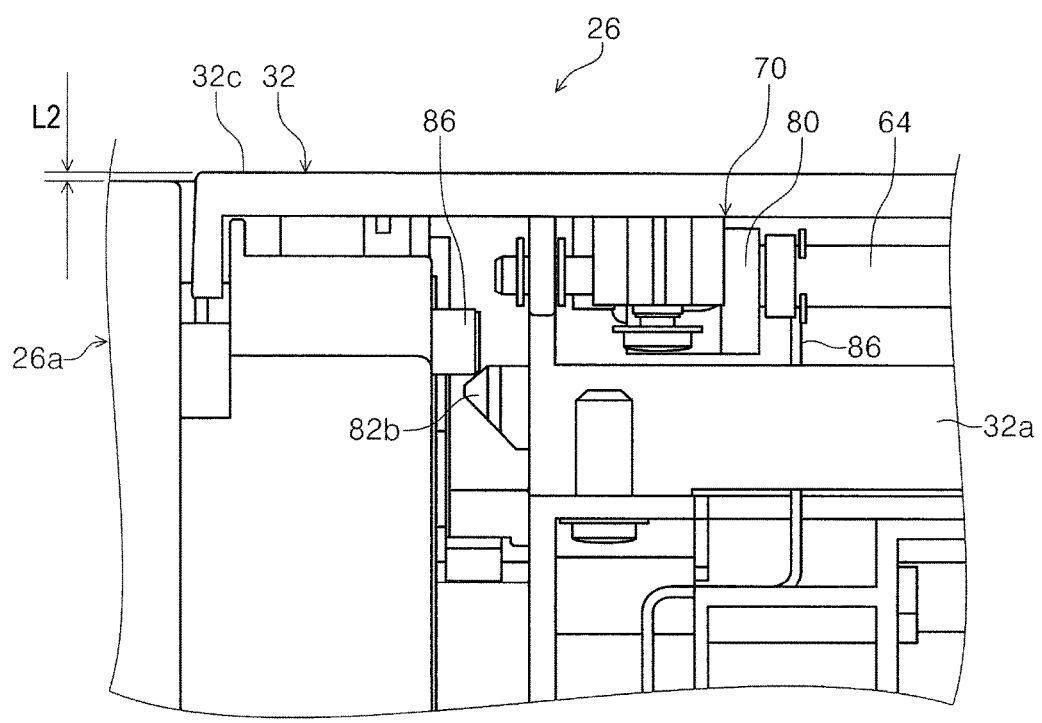
FIG. 30 is a side view illustrating the second locking portion in a state where the cover is not completely closed with respect to the main body portion.
Figure 31:
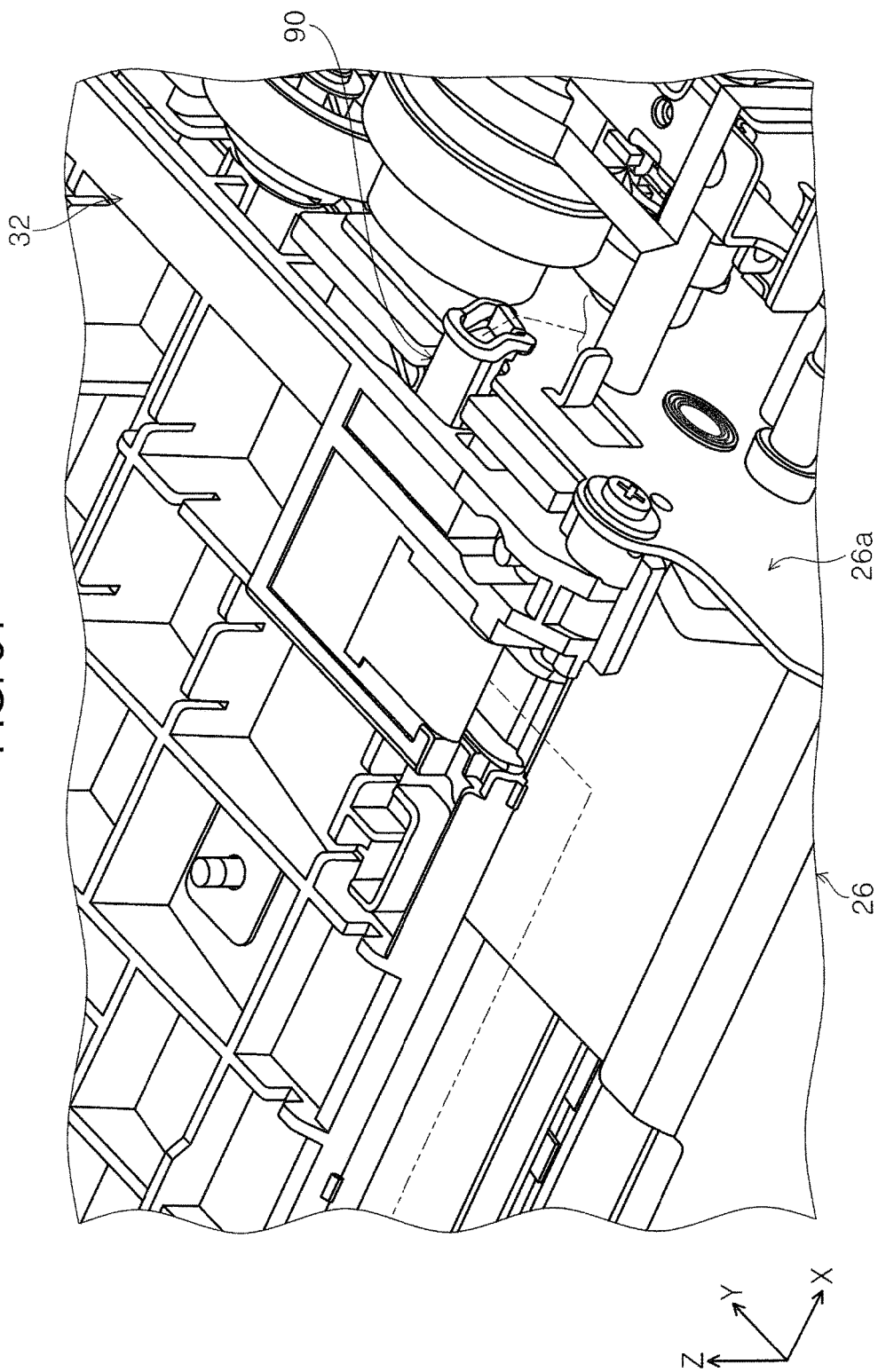
FIG. 31 is a perspective view illustrating a cable cover provided on the cover through which a cable passes from the main body portion to the cover.
Figure 32:
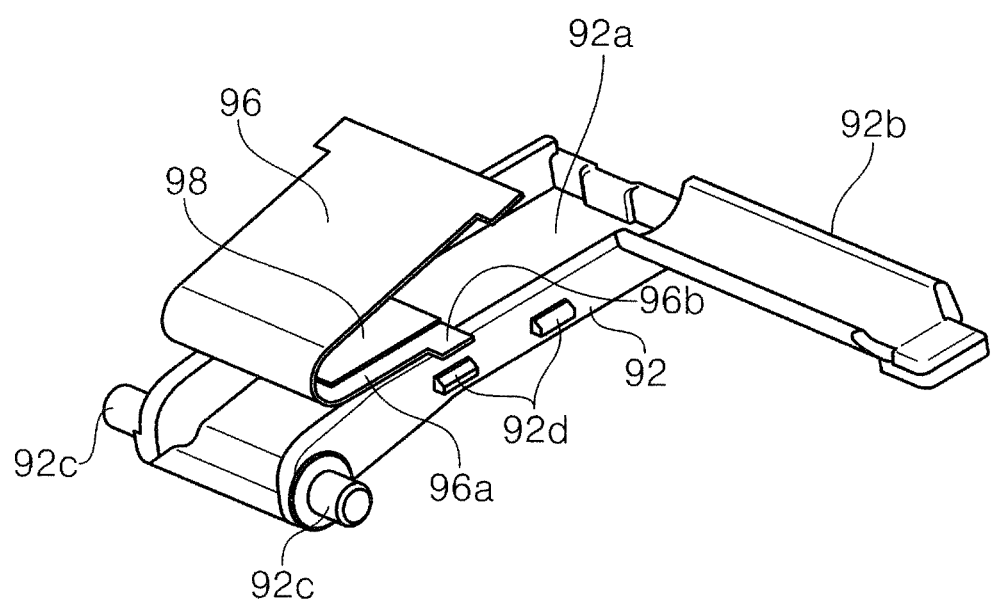
FIG. 32 is a perspective view illustrating a first cable cover member and a sheet member.
Figure 33:
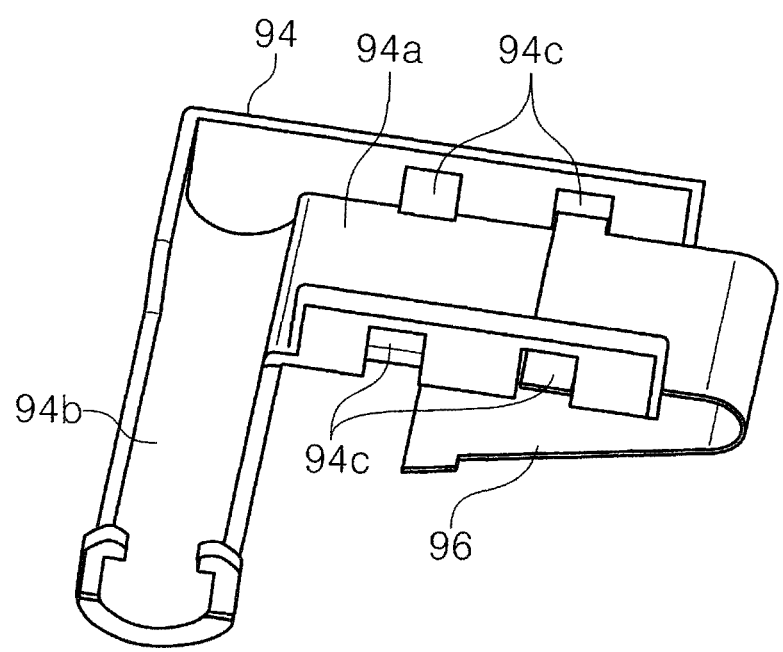
FIG. 33 is a perspective view illustrating a second cable cover member and a sheet member.
Figure 33:
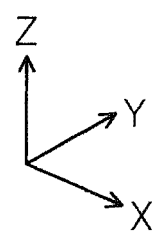
Figure 34:
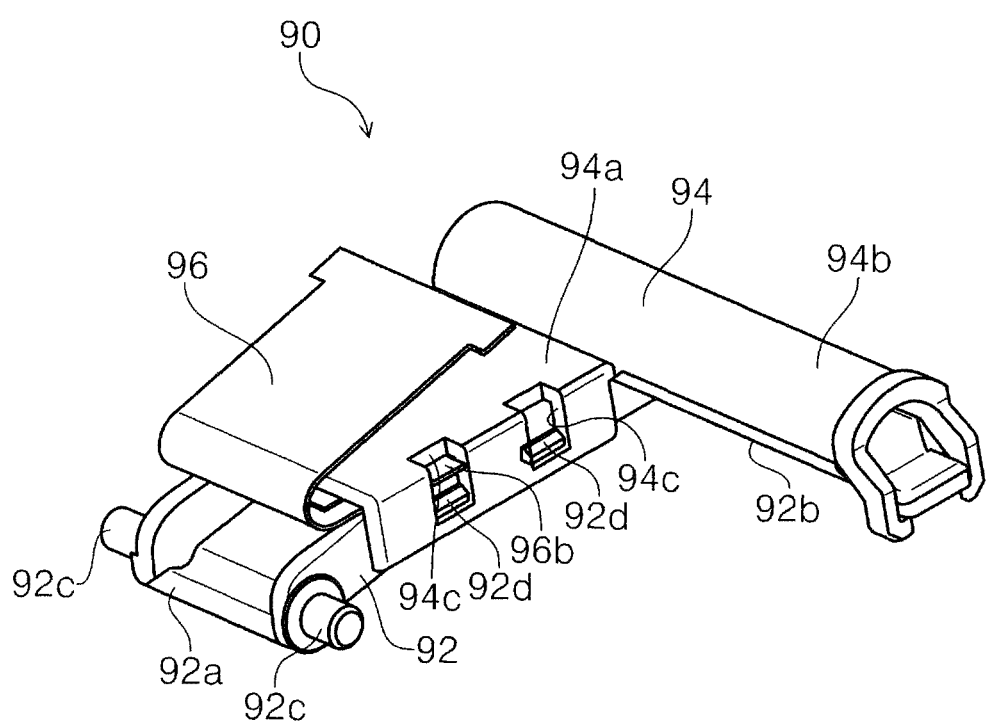
FIG. 34 is a perspective view illustrating the cable cover.
Figure 35:
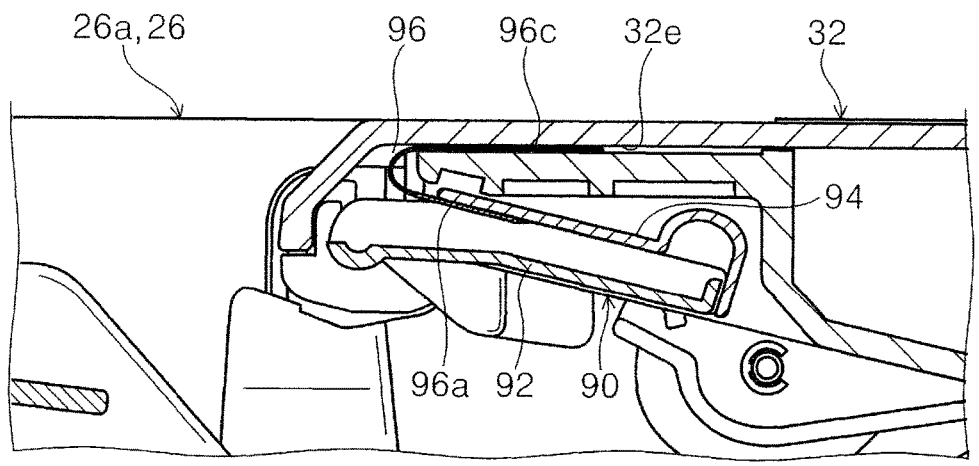
FIG. 35 is a side sectional view illustrating a state of the sheet member when the cover is closed with respect to the main body portion.
Figure 35:
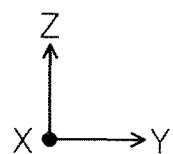
Figure 36:
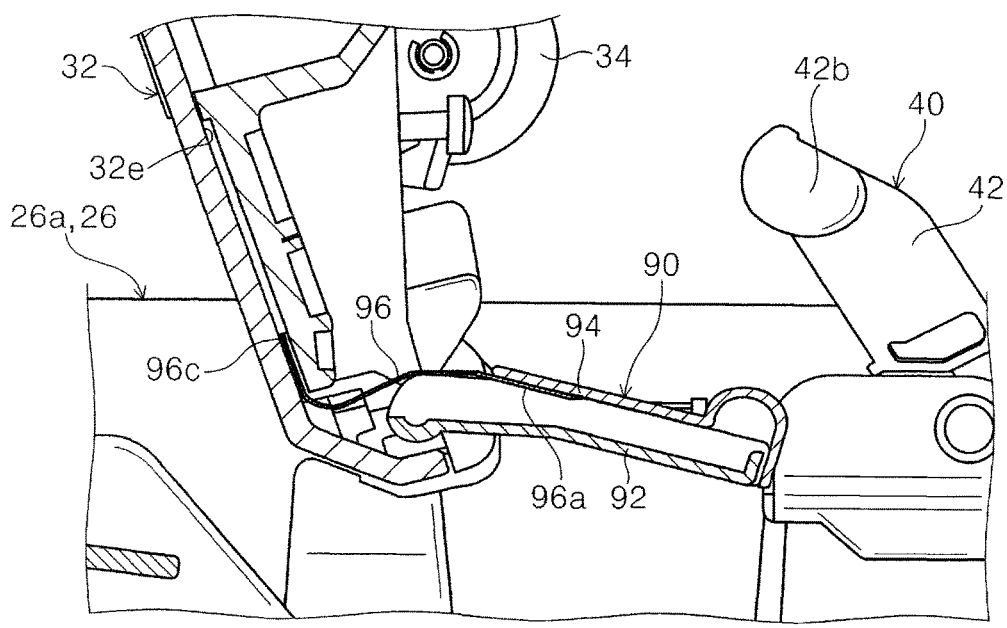
FIG. 36 is a side sectional view illustrating a state of the sheet member when the cover is opened with respect to the main body portion.
Figure 36:
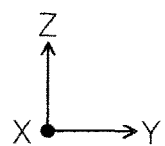

FIG. 28 is a side view in a state where the cover completely is closed with respect to the main body portion, FIG. 29 is a side view in a state where the cover is not completely closed with respect to the main body portion, FIG. 30 is a side view illustrating the second locking portion in a state where the cover is not completely closed with respect to the main body portion, FIG. 31 is a perspective view illustrating a cable cover provided on the cover through which a cable is passed from the main body portion to the cover, FIG. 32 is a perspective view illustrating a first cable cover member and a sheet member, FIG. 33 is a perspective view illustrating a second cable cover member and a sheet member, FIG. 34 is a perspective view illustrating the cable cover, FIG. 35 is a side sectional view illustrating a state of the sheet member when the cover is closed with respect to the main body portion, and FIG. 36 is a side sectional view illustrating a state of the sheet member when the cover is opened with respect to the main body portion.

In addition, in the XYZ coordinate system illustrated in each drawing, the X-direction indicates a width direction of a recording medium, that is, a device depth direction, the Y-direction indicates a transporting direction of the recording medium in a transporting path in a recording device, that is, a device width direction, and the Z-direction indicates a device height direction.

First Example

Overview of Disclosure

A basic idea in this example is that a holding unit that holds a cover in an open state is simply configured in which the cover is provided rotatably with respect to a main body portion in a scanner, forms a portion of a medium transporting path by closing thereof, and exposes the medium transporting path by opening thereof.

Configuration of Printer

The overall configuration of a printer 10 according to the present disclosure will be briefly described with reference to FIG. 1. The printer 10 is configured as an ink jet printer, as an example of a recording device. The printer 10 is configured as a multifunction peripheral including a device main body 12 and a scanner 14.

The device main body 12 has a plurality of medium accommodation portions 16 which can accommodate a medium in a lower portion in a device height direction. The medium accommodation portion 16 is attached to the device main body 12 so as to be capable of being inserted and removed from a front surface side in a device depth direction. In addition, the device main body 12 is provided with a line head 18 (see a broken line portion). As an example, when the medium is transported to a region facing a head surface of the line head 18, the line head 18 is configured so as to discharge ink from a plurality of nozzles provided on the head surface to a recording surface of the medium to perform recording. As an example, the line head 18 in this example is a recording head provided so that a nozzle for discharging ink covers the entire region in a paper width direction and is configured as a recording head in which the recording can be performed on the entire width of the paper without being accompanied by the movement in the paper width direction.

In addition, a discharge tray 20 is provided above of the line head 18 in the device height direction. In addition, an operation portion 22 is provided on a front surface side in the device depth direction above the discharge tray 20 in the device height direction. The operation portion 22 is disposed on a front surface side of the scanner 14 in the device depth direction.

Here, the medium accommodated in the medium accommodation portion 16 is fed toward the line head 18 by a feeding unit (not illustrated). When the medium is fed to a region facing the line head 18, the recording on the medium is performed by the line head 18. The medium on which the recording is performed is discharged from the region facing the line head 18 toward the discharge tray 20 by a discharge unit (not illustrated).

Scanner Overview

Next, the configuration of the scanner 14 will be described with reference to FIG. 2 to FIG. 4. The scanner 14 includes a scanner main body 24 and an autodocument feeder portion (hereinafter referred to as an ADF portion) 26 as "medium transporting device" or "opening/closing device". A first image reading surface 24a (see a broken line portion in FIG. 2) and a second image reading surface 24b (see the broken line portion in FIG. 2) are provided above the scanner main body 24. As an example, the first image reading surface 24a and the second image reading surface 24b are formed of a flat and transparent glass plate.

An image reading unit 28 (see broken line portion in FIG. 2) as "reading unit" is disposed below the first image reading surface 24a and the second image reading surface 24b in the device height direction. The image reading unit 28 includes an optical detector (not illustrated) for reading image which extends in the device depth direction. The image reading unit 28 is configured to be movable in a medium transporting direction (Y-axis direction in FIG. 2) of the medium transported by the ADF portion 26.

The ADF portion 26 is provided above the scanner main body 24 so as to be rotatable with respect to the scanner main body 24. Specifically, the ADF portion 26 opens/closes the first image reading surface 24a and the second image reading surface 24b provided above the scanner main body 24 by setting a rear surface side of the scanner main body 24 in the device depth direction as a supporting point of a rotation shaft.

In addition, the ADF portion 26 includes a main body portion 26a, a medium mounting tray 26b, and a medium discharge tray 26c. In addition, the main body portion 26a includes a medium transporting path 30 (see FIG. 3) for transporting the medium from the medium mounting tray 26b to the medium discharge tray 26c. A cover 32 as an "opening/closing body" which forms a portion of the medium transporting path 30 in a closed state (see FIG. 2) and exposes the medium transporting path 30 in an open state (see FIG. 3) is attached to the main body portion 26a.

More specifically, as illustrated in FIG. 3, by opening the cover 32 with respect to the main body portion 26a, a pickup roller 34, a retard roller 35, a feeding roller 36 which abuts against the retard roller 35, and the plurality of the transporting rollers 38, and the like can be exposed in the medium transporting path 30.

In addition, the cover 32 is provided with a path forming portion 32a. When the cover 32 is closed with respect to the main body portion 26a, the path forming portion 32a constitutes a portion of the medium transporting path 30.

About Holding Unit

Next, with reference to FIG. 4 to FIG. 8, the holding unit 40 will be described. As illustrated in FIG. 4, the holding unit 40 is provided at an end portion on a front surface side of the main body portion 26a of the ADF portion 26 in the device depth direction. In FIG. 4, an illustration of the exterior of the ADF portion 26 is omitted.

Further, with reference to FIG. 5, the configuration of the holding unit 40 will be described. The holding unit 40 includes a rotation member 42 and a pressing unit 44. The rotation member 42 is rotatably attached to the pressing unit 44. A cam follower 42a is provided on the rotation shaft side and a supporting portion 42b is provided on a free end side opposite to the rotation shaft side. In addition, the pressing unit 44 includes a pressing member 46 and a cam 48 which abuts against the cam follower 42a. A cam surface 48a is formed on the cam 48. The pressing member 46 is configured as a coil spring as an example. In this example, the cam 48 is biased in a direction to press the cam follower 42a by the pressing member 46.

The rotation member 42 is configured to be switchable between a closed state (see FIG. 6) along the pressing unit 44 and an open state (see FIG. 7) by rotating with respect to the pressing unit 44. As illustrated in FIG. 6, a rotation regulated portion 42c is provided on the rotation member 42. In addition, the pressing unit 44 is provided with a rotation regulating portion 44a. As illustrated in FIG. 7, when the rotation member 42 rotates from a closed state with respect to the pressing member 44 in the opening direction, the rotation regulated portion 42c engages with the rotation regulating portion 44a and thus the rotation of the rotation member 42 by a predetermined angle or more is regulated. In this example, the predetermined angle is set to 45 degrees as an example.

Next, with reference to FIG. 5 to FIG. 8, in particular, FIG. 8, a supported portion 32b which engages with and is supported by the supporting portion 42b of the rotation member 42 is formed on an end portion of a front surface side of the cover 32 in the device depth direction. The supported portion 32b includes a sliding contact surface 50, a first engaging portion 52, and a second engaging portion 54. The sliding contact surface 50 is positioned above the supporting portion 42b in the device height direction in a state where the cover 32 is closed with respect to the main body portion 26a (state where rotation member is closed). Further, the first engaging portion 52 is positioned below the supporting portion 42b so as to interpose the supporting portion 42b between the sliding contact surface 50 and the first engaging portion 52 in a state where the cover 32 is closed. Further, the second engaging portion 54 is positioned at a position further away from the supporting portion 42b than the first engaging portion 52 below the supporting portion 42b in a state where the cover 32 is closed.

The sliding contact surface 50 includes a plurality of protrusions 50a and 50b and a plurality of supporting surfaces 50c, 50d, and 50e. Specifically, the sliding contact surface 50 includes a first protrusion 50a and a second protrusion 50b. The first protrusion 50a, the second protrusion 50b, and the supporting surfaces 50c, 50d, and 50e will be described below. As illustrated in FIG. 8, the first engaging portion 52 is formed as a rib extending in the device height direction as an example. In addition, the second engaging portion 54 is formed with an inclined surface 54a below in the device height direction. The inclined surface 54a will also be described below.

About Opening/Closing Operation of Cover

Figure 9A:
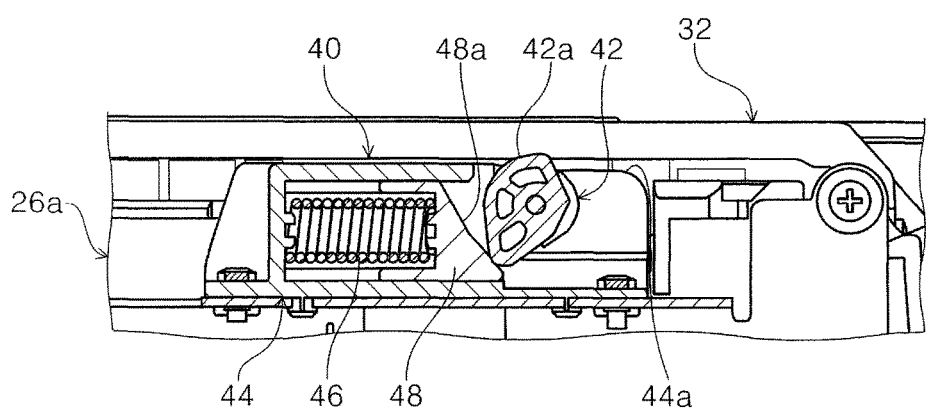
FIGS. 9A and 9B are side sectional views illustrating a relationship between a cam and a cam follower and a relationship between a supporting portion and the sliding contact surface in a state where the cover is closed.
Figure 9B:
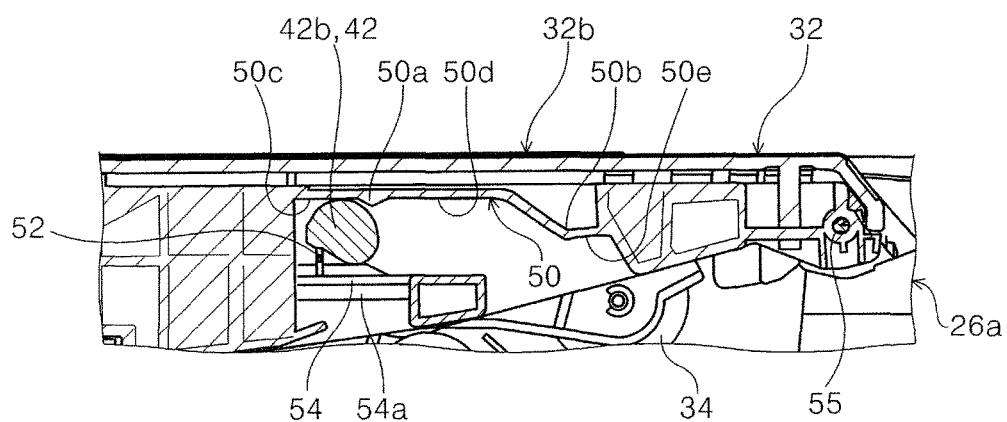

Next, with reference to FIG. 9 to FIG. 14, an opening/closing operation of the cover 32 with respect to the main body portion 26a, that is, a rotation operation will be described. FIG. 9 illustrates a relationship between the cam follower 42a and the cam 48 and a relationship between the supporting portion 42b and the sliding contact surface 50 in the holding unit 40 in a state where the cover 32 completely is closed with respect to the main body portion 26a. FIGS. 9A and 9B to FIGS. 14A and 14B illustrate changes of the holding unit 40 by opening of the cover 32 in sectional positions at section line A-A and section line B-B illustrated in FIG. 5 in the device depth direction.

In a state where the cover 32 completely is closed with respect to the main body portion 26a, even if the cam 48 presses the cam follower 42a rightward in the device width direction (−Y-axis direction in FIG. 9) by the pressing force of the pressing member 46, the cam follower 42a is configured not to rotate in a direction in which the cover 32 is opened, that is, in the clockwise direction in FIG. 9. Specifically, the shape of the cam follower 42a is formed so that at least a portion of the pressing force of the pressing member 46 is not converted into a force of the raised direction component of the cover 32 in a state where the cover 32 completely is closed with respect to the main body portion 26a. Therefore, in a state where the cover 32 completely is closed with respect to the main body portion 26a, since the pressing unit 44 does not apply an external force of the cover 32 in the raised direction to the rotation member 42, the cover 32 is likely to be maintained a closed state with respect to the main body portion 26a.

In addition, in a state where the cover 32 completely is closed with respect to the main body portion 26a, the supporting portion 42b is interposed between the supporting surface 50c of the sliding contact surface 50 and the first engaging portion 52 in the device height direction. In FIG. 9, although the supporting surface 50c and the first engaging portion 52 are illustrated in a state of being in contact with the supporting portion 42b, the supporting surface 50c and the first engaging portion 52 may be spaced apart from the supporting portion 42b.

Next, with reference to FIG. 10, when the cover 32 starts rotating from a state of completely closing with respect to the main body portion 26a in the raised direction by the user lifting the cover 32 in the raised direction (clockwise direction in FIG. 10), the first engaging portion 52 positioned below the supporting portion 42b lifts the supporting portion 42b in the raised direction of the cover 32. At this time, the supporting portion 42b starts rotating in a state of being in contact with the supporting surface 50c or in a state where the gap between the supporting portion 42b and the supporting surface 50c is small even if the supporting portion 42b and the supporting surface 50c are spaced apart from each other.

When the rotation member 42 starts rotating in the raised direction of the cover 32, the cam follower 42a also starts rotating in the clockwise direction in FIG. 10 and slides on the cam surface 48a of the cam 48. Accordingly, at least a portion of the pressing force of the pressing member 46 is converted into the force of the raised direction component of the cover 32. Therefore, the supporting portion 42b of the rotation member 42 receives the pressing force in the clockwise direction in FIG. 10, that is, in the raised direction of the cover 32.

In this example, as described above, since the supporting portion 42b starts rotating in a state where the supporting portion 42b is in contact with the supporting surface 50c or in a state where the gap between the supporting portion 42b and the supporting surface 50c is small even if the supporting portion 42b and the supporting surface 50c are spaced apart from each other, the possibility that the supporting portion 42b rotates vigorously toward the supporting surface 50c side and thus collides with the supporting surface 50c can be reduced when the supporting portion 42b receives the pressing force of the pressing member 46 in the raised direction. As a result, the collision sound between the supporting portion 42b and the supporting surface 50c can be reduced.

Next, with reference to FIG. 11, when the cover 32 further rotates in the raised direction, the cam follower 42a is pressed against the cam 48 by the pressing force of the pressing member 46 and further rotates in the clockwise direction on the cam surface 48a. Accordingly, the supporting portion 42b of the rotation member 42 slides along the supporting surface 50c on the sliding contact surface 50 and rides over the first protrusion 50a to move to the supporting surface 50d.

Here, for example, when the user releases his/her hand from the cover 32, the supporting portion 42b engages with the first protrusion 50a to be caught on the first protrusion 50a (state of FIG. 11). The rotation member 42 is biased in the raised direction of the cover 32 by the pressing force of the pressing member 46. Here, in this example, as an example, since the magnitude of the raised direction component of the pressing force is set to a magnitude balancing with the own weight of the cover 32, that is, the force that the cover 32 tries to close (force also considered the engagement between the supporting portion 42b and the first protrusion 50a), an opening posture of the cover 32 is held by the holding unit 40. As an example, the opening angle of the cover 32 which is held by the supporting portion 42b engaging with the first protrusion 50a is set to 20 degrees.

In addition, in this example, when the opening angle of the cover 32 is 20 degrees, 30 degrees and 45 degrees which will be described below, the magnitude of the raised direction component of the pressing force and the own weight of the cover 32, that is, the force that the cover 32 tries to close are set to be balanced with each other. The magnitude of the raised direction component of the pressing force is set to an extent to weaken the force that the cover 32 tries to close, that is, an extent that the force balances and does not reach the force until the cover 32 stands still at angles other than 20 degrees, 30 degrees, and 45 degrees.

Next, with reference to FIG. 12, when the cover 32 further rotates from a state of FIG. 11 in the raised direction, the cam follower 42a further rotates in the clockwise direction on the cam surface 48a by the pressing force of the pressing member 46. The supporting portion 42b of the rotation member 42 slides along the supporting surface 50d at the sliding contact surface 50 to the position of FIG. 12. As an example, the opening angle of the cover 32 in FIG. 12 is set to 30 degrees. In addition, in this state, for example, when the user releases his/her hand from the cover 32, since the magnitude of the raised direction component of the pressing force is balanced with the own weight of the cover 32, the opening angle of the cover 32 is held at 30 degrees.

In addition, when the user releases his/her hand from the cover 32 in a state where the cover 32 slightly is closed from the opening angle of 30 degrees (state in FIG. 12), that is, in a state where the supporting portion 42b is at the position close to the protrusion 50a with respect to the position in FIG. 12, the cover 32 is displaced in the closing direction due to the own weight thereof, the supporting portion 42b engages with the first protrusion 50a and caught on the first protrusion 50a (state of FIG. 11), and thus a state where at least the cover 32 is open is maintained. In addition, even if the user releases his/her hand from the cover 32 in a state where the cover 32 slightly is closed from the opening angle of 30 degrees (state in FIG. 12), since the raised direction component of the pressing force acts on the cover 32 so as to weaken the force that the cover 32 tries to close, impact when the supporting portion 42b and the first protrusion 50a engage with each other is alleviated.

Further, since there is the first protrusion 50a, semi-tightening of the cover 32 which will be described below can be suppressed. More specifically, the semi-tightening of the cover 32 is generated by the fact that the user does not push down the cover 32 firmly against the main body portion 26a. If the first protrusion 50a is not provided, since the user can push down the cover 32 without any caught when closing the cover 32, the pushing force when closing the cover 32 is likely to be insufficient, that is, the semi-tightening of the cover 32 is likely to be generated. However, if the first protrusion 50a is provided as described above, the user needs to apply a strong force once in order for the supporting portion 42b to ride over the first protrusion 50a, the pushing down force when closing the cover 32 is likely to be large, and as a result, the semi-tightening of the cover 32 can be suppressed.

Next, with reference to FIG. 13, when the cover 32 further rotates from a state of FIG. 12 in the raised direction, the cam follower 42a further rotates in the clockwise direction on the cam surface 48a by the pressing force of the pressing member 46. The supporting portion 42b of the rotation member 42 slides along the supporting surface 50d at the sliding contact surface 50 and rides over the second protrusion 50b to move to the supporting surface 50e.

Here, for example, when the user releases his/her hand from the cover 32, the supporting portion 42b engages with the second protrusion 50b to be caught on the second protrusion 50b. As a result, the opening posture of the cover 32 is held by the holding unit 40. As an example, the opening angle of the cover 32 in FIG. 13 is set to 45 degrees.

Next, with reference to FIG. 14, when the cover 32 is further rotated in the raised direction from a state of FIG. 13 and the opening angle of the cover 32 exceeds a predetermined angle, the rotation angle of the rotation member 42 reaches the limit. In other words, since the rotation regulated portion 42c (see FIG. 5) of the rotation member 42 and the rotation regulating portion 44a of the pressing unit 44 abut against each other and thus the rotation of the rotation member 42 is in a state of being regulated, the supporting portion 42b is spaced apart from the sliding contact surface 50 of the cover 32 and the engagement state between the supporting portion 42b and the sliding contact surface 50 is released. In this example, the predetermined angle is set to 45 degrees as an example.

In addition, when the user releases his/her hand from the cover 32 in a state where the cover 32 slightly is closed from the opening angle of 90 degrees (state in FIG. 14), the cover 32 is displaced in the closing direction due to own weight thereof, and the supporting portion 42b engages with the second protrusion 50b, caught on the second protrusion 50b (state in FIG. 13), and at least a state where the cover 32 is open at 45 degrees is maintained. In addition, even if the user releases his/her hand from the cover 32 in a state where the cover 32 slightly is closed from the opening angle of 90 degrees (state in FIG. 14), since the raised direction component of the pressing force acts on the cover 32 so as to weaken the force that the cover 32 tries to close, the impact at the time of engaging between the supporting portion 42b and the second protrusion 50b is alleviated.

When the opening angle of the cover 32 opens to 90 degrees or more and the center of the cover 32 exceeds the center of the rotation shaft 55 (see sectional view illustrated in FIG. 14 (B-B)), the own weight of the cover 32 acts in a direction opposite to the closing direction thereof so that the cover 32 maintains an open state with respect to the main body portion 26a.

In this example, when the cover 32 is not completely closed and the cover 32 is opened and the supporting portion 42b and the sliding contact surface 50 engage with each other, since the pressing force of the pressing member 46 is acted to the supporting portion 42b, the operation force of the opening operation of the cover 32 can decrease and the opening operation can be performed smoothly.

In addition, when the cover 32 tries to close from the state in FIG. 14, even if the hand of the user is spaced apart from the cover 32 so that the cover 32 is vigorously closed in a closing direction thereof, the supporting portion 42b of the rotation member 42 engages with the sliding contact surface 50 and then the momentum in the closing direction of the cover 32 is reduced by the pressing force of the pressing member 46. As a result, the damage, the failure of the equipment, or the like can be reduced.

In addition, in this example, as an example, since the opening angles with respect to the main body portion 26a of the cover 32 can be held at 20 degrees, 30 degrees, and 45 degrees, when a jam is generated in the medium in the medium transporting path 30, since the cover 32 can be held with a sufficient opening angle, the workability at the time of releasing the jam can be improved.

About Closing Operation of Cover in a Case where Cover is Open and Rotation Member is Closed with Respect to Main Body Portion With reference to FIG. 15, in a state where the cover 32 is open, for example, there is a case where the rotation member 42 falls down (closes) with respect to the pressing unit 44 independently of the cover 32 by the operation of the user. In this example, an inclined surface 54a (see FIG. 8) is formed in the lower portion of the second engaging portion 54 provided on the supported portion 32b of the cover 32. When the cover 32 is closed in this state, the second engaging portion 54 can ride over the supporting portion 42b of the rotation member 42 which is in a state of being dropped by the inclined surface 54a and enter below the supporting portion 42b. As a result, the cover 32 can be correctly closed with respect to the main body portion 26a.

In addition, even in a case where the first engaging portion 52 cannot raise the supporting portion 42b (rotation member 42) by the first engaging portion 52 being damaged or worn, when the cover 32 is opened, the second engaging portion 54 can be in contact with the supporting portion 42b and be raised so that the function of the holding unit 40 is held.

About Regulation Belt

Next, the regulation belt 56 will be described with reference to FIG. 16 to FIG. 21. With reference to FIG. 16 and FIG. 17, in the ADF portion 26, the regulation belt 56 is provided between the main body portion 26a and the cover 32. The regulation belt 56 regulates the opening angle of the cover 32 with respect to the main body portion 26a.

Here, when the jam of the medium generated in the medium transporting path 30 in the ADF portion 26 is released, if the cover 32 is unnecessarily opened relative to the main body portion 26a, the cover 32 can be vigorously closed with respect to the main body portion 26a and the user can inadvertently access the pickup roller 34, the retard roller 35, the feeding roller 36, and the like in the medium transporting path 30, which are undesirable. Therefore, when the jam is generated in the medium transporting path 30, the regulation belt 56 regulates the opening angle of the cover 32 so as to open the cover 32 by an opening angle enough to perform the work of removing the medium.

The regulation belt 56 is formed as a thin sheet-like member as illustrated in FIG. 18. As an example, the regulation belt 56 is formed of a resin material or the like. A fixing portion 56a for fixing to the cover 32 is provided at one end of the regulation belt 56. In this example, two through holes are formed in the fixing portion 56a. In addition, an engaging portion 56b for fixing to the main body portion 26a is provided at the other end of the regulation belt 56. The engaging portion 56b is configured as one through hole. In addition, a crease 56c for folding the regulation belt 56 is provided between the one end and the other end of the regulation belt 56.

As illustrated in FIG. 16 and FIG. 21, one end of the regulation belt 56 is attached to the cover 32 by an engaging pin 58 protruding from the cover 32 passing through two through holes of the fixing portion 56a and a fastening component such as push nuts being fastened to the engaging pin 58. On the other hand, the other end of the regulation belt 56 engages with the main body portion 26a of the ADF portion 26. As illustrated in FIG. 17, FIG. 19 and FIG. 20, an engaged portion 60 is provided on the upper portion 26d of the main body portion 26a. The engaged portion 60 is provided with a belt passing portion 60a and an engaged pin 60b. The belt passing portion 60a protrudes upward in the device height direction from the upper portion 26d. In the belt passing portion 60a, a slit is formed so that the other end of the regulation belt 56 can pass through in the device width direction (Y-axis direction in FIG. 19). In addition, an inclined surface 60c is formed on the side of the belt passing portion 60a in the engaged pin 60b.

As illustrated in FIG. 19, the other end of the regulation belt 56 is passed through the slit of the belt passing portion 60a and the engaging portion 56b is fitted into the engaged pin 60b. Here, since the inclined surface 60c guides the other end of the regulation belt 56 being passed through the slit of the belt passing portion 60a to the upper side in the device height direction, the engaging portion 56b is likely to be fitted to the engaged pin 60b. As a result, operability in fixing the regulation belt 56 to the main body portion 26a can be improved.

Here, when the cover 32 tries to open at a predetermined angle or more with respect to the main body portion 26a, the regulation belt 56 is pulled. In the engaged portion 60, the other end of the regulation belt 56 is pulled in the device width direction (+Y-axis direction in FIG. 19). However, since the engaged pin 60b regulates the displacement of the other end of the regulation belt 56 in the device width direction, the regulation belt 56 regulates the rotation of the cover 32 at a predetermined angle or more with respect to the main body portion 26a. Although one end of the regulation belt 56 is also pulled, since the fixing portion 56a engages with the engaging pin 58, displacement of the fixing portion 56a is also regulated so that rotation of the cover 32 at a predetermined angle or more is regulated.

Here, with reference to FIG. 20, in a case where the cover 32 opens with respect to the main body portion 26a by a predetermined angle or more, the engaging portion 56b of the regulation belt 56 is lifted upward in the device height direction and a state where the engaging portion 56b and the engaged pin 60b are fitted into each other is released. By pulling out the engaging portion 56b of the regulation belt 56 from the belt passing portion 60a, a state where the regulation belt 56 is regulated with respect to the cover 32 is released. Accordingly, the cover 32 can be opened to a predetermined angle or more with respect to the main body portion 26a.

In addition, the regulation belt 56 whose regulated state is released is folded at the crease 56c and disposed on the cover 32 side. In this example, as an example, the predetermined angle is set to 45 degrees. In addition, by opening the cover 32 at a predetermined angle or more with respect to the main body portion 26a, the pickup roller 34, the retard roller 35, and the feeding roller 36 in the medium transporting path 30 can be accessed and the pickup roller 34 or the like can be replaced. In this case, since the cover 32 is largely opened with respect to the main body portion 26a, as an example, the space required for the replacement work of the pickup roller 34 can increase and the replacement work can be facilitated.

About Cover Locking Unit

Next, with reference to FIG. 4, FIG. 22 to FIG. 30, the locking unit 62 of the cover 32 will be described. First, an overview of providing the locking unit 62 on the cover 32 will be described. In a case where the cover 32 is not completely closed with respect to the main body portion 26a as described above, the pressing force of the pressing member 46 (FIG. 5) acts on the rotation member 42 in the raised direction of the cover 32. As a result, a force acts on the cover 32 upward in the device height direction, that is, in a direction hindering the cover 32 from completely closing. Further, when the cover 32 tries to close, the retard roller 35 abuts against the feeding roller 36. The retard roller 35 is biased toward the feeding roller 36 by a pressing unit (not illustrated). In other words, the pressing force of the pressing unit (not illustrated) acts on the cover 32 which is in a state of completely closing in the raised direction of the cover 32 via the retard roller 35 and the feeding roller 36.

In other words, in a state where the cover 32 completely is closed with respect to the main body portion 26a, the force described above acts in the raised direction of the cover 32. Therefore, as a result, even if the cover 32 tries to completely close, there is a case where the cover 32 is in a state of not being completely closed (hereinafter referred to as semi-tight state) is generated (details of semi-tight state will be described below). Although the locking unit 62 in this example locks the cover 32 in a state of completely being closed, the locking unit is configured so that the user can distinguish the semi-tight state of the cover 32 by visual inspection. Hereinafter, the locking unit 62 will be described in detail.

With reference to FIG. 4, the locking unit 62 is provided above the cover 32. The locking unit 62 includes a rotation shaft 64 extending in the device depth direction, a lever 66, a first locking portion 68, and a second locking portion 70. The lever 66 is attached to the rotation shaft 64 and swings with the rotation of the rotation shaft. The lever 66 is disposed in a recessed portion 32d (see FIG. 2) provided at a position close to the front surface side on the upper surface 32c of the cover 32 in the device depth direction. By inserting a finger of a user or the like into the recessed portion 32d, the lever 66 can be operated. Specifically, it is configured that a state where the locking unit 62 is locked is released by inserting a finger into the recessed portion 32d and pulling up the lever 66.

In addition, the first locking portion 68 is provided on the front surface side of the rotation shaft 64 in the device depth direction and the second locking portion 70 is provided on the rear surface side of the rotation shaft 64 in the device depth direction. With reference to FIG. 22 and FIG. 23, the first locking portion 68 is provided at a position close to the lever 66 in the device depth direction. As illustrated in FIG. 23, the first locking portion 68 includes a rotation member 72, a slider member 74, and a pressing member 76. The rotation member 72 is attached to the rotation shaft 64 and configured to rotate in the same direction together with the rotation of the rotation shaft 64. In other words, when the lever 66 is pulled up (in arrow direction of lever denoted by reference numeral A1 in FIG. 23), the rotation member 72 also rotates in the direction A1 which is the same direction as that of the rotation member 72. The rotation member 72 is provided with a cam follower 72a.

The slider member 74 is configured to be displaceable in the device depth direction in the cover 32. The slider member 74 includes a cam portion 74a and an engaging portion 74b. The engaging portion 74b is provided at one end portion of the slider member 74 in the device depth direction.

The other end portion of the slider member 74 engages with the pressing member 76. The pressing member 76 presses the slider member 74 toward the front surface side in the device depth direction. The pressing member 76 is configured as a coil spring as an example. In addition, a cam surface 74c is formed on the cam portion 74a.

The cam follower 72a is configured to be engageable with the cam surface 74c of the cam portion 74a according to the rotation of the rotation member 72. Specifically, when the lever 66 is rotated in a direction in which the lever 66 is pulled up, the cam follower 72a comes close to the cam portion 74a, engages with the cam surface 74c of the cam portion 74a, and then the cam follower 72a presses the cam surface 74c to displace the slider member 74 to a rear surface side in the device depth direction, that is, to a direction of the arrow B1 against the pressing force of the pressing member 76. FIG. 23 illustrates a state where the opening angle of the lever 66 is 0°, and in this state, the cam follower 72a of the rotation member 72 is spaced apart from the cam surface 74c of the cam portion 74a of the slider member 74.

In addition, as illustrated in FIG. 22, in a state where the lever 66 is closed, that is, in a state where the cover 32 is closed, the engaging portion 74b protrudes from the cover 32 toward the front surface side in the device depth direction and enters below in the device height direction of the engaging pin 78 provided to the main body portion 26a. Accordingly, the first locking portion 68 comes to a state of being locked. On the other hand, when the lever 66 is rotated in a direction in which the lever 66 is pulled up, the slider member 74 moves to the rear surface side in the device depth direction by the cam follower 72a of the rotation member 72 and the engagement state between the engaging pin 78 and the engaging portion 74b is released. Accordingly, the first locking portion 68 comes to a state of being unlocked.

Next, the configuration of the second locking portion 70 will be described with reference to FIG. 24 and FIG. 25. The second locking portion 70 includes a rotation member 80, a slider member 82, a pressing member 84, and a pressing member 86. The rotation member 80 is attached to the rotation shaft 64 and configured to rotate in the same direction together with the rotation of the rotation shaft 64. In other words, when the lever 66 is pulled up (in arrow direction of lever denoted by reference numeral A1 in FIG. 25), the rotation member 80 also rotates in a direction A1 which is also the same direction as that of the rotation member 80. The rotation member 80 is provided with a cam follower 80a.

The slider member 82 is configured to be displaceable in the device depth direction in the cover 32. The slider member 82 includes a cam portion 82a and an engaging portion 82b. The engaging portion 82b is provided at one end portion of the slider member 82 in the device depth direction. In this example, the length of the engaging portion 82b in the device depth direction is made longer than that of the engaging portion 74b of the slider member 74 of the first locking portion 68. The other end portion of the slider member 82 engages with the pressing member 84. The pressing member 84 presses the slider member 82 toward the rear surface side in the device depth direction. The pressing member 84 is configured as a coil spring as an example. A cam surface 82c is formed in the cam portion 82a.

The cam follower 80a engages with the cam surface 82c of the cam portion 82a even in a state where the lever 66 completely is closed. When the lever 66 is rotated in the direction A1, which is a direction in which the lever 66 is pulled up, the cam follower 80a presses the cam surface 82c of the cam portion 82a and displaces the slider member 82 against the pressing force of the pressing member 84 to a front surface side in the device depth direction, that is, in the direction of the arrow B2. FIG. 25 illustrates a state where the opening angle of the lever is 0 degree and in this state, the cam follower 80a of the rotation member 80 is in contact with the cam surface 82c of the cam portion 82a of the slider member 82 unlike the cam follower 72a of the rotation member 72. In this example, the relationship (which will be described above) between the cam follower 80a and the cam surface 82c of the cam portion 82a is set so as to delay an operation of the engaging portion 82b of the second locking portion 70 with respect to an operation of the engaging portion 74b of the first locking portion 68 when the cover 32 is closed.

In addition, as illustrated in FIG. 24, in a state where the lever 66 is closed, that is, in a state where the cover 32 is closed, the engaging portion 82b protrudes from the cover 32 toward the rear surface side in the device depth direction to enter below the engaging pin 88 provided to the main body portion 26a in the device height direction. Accordingly, the second locking portion 70 comes to a state of being locked. On the other hand, when the lever 66 is rotated in the A1 direction (see FIG. 25) which is a direction in which the lever 66 is pulled up, the slider member 82 moves to the front surface side in the device depth direction by the cam follower 80a of the rotation member 80 and thus a state where the engaging pin 88 and the engaging portion 82b engage with each other is released. Accordingly, the second locking portion 70 comes to a state of being unlocked.

Here, the pressing member 86 is configured as a torsion spring. The pressing member 86 is attached to the rotation member 80 and presses the rotation member 80 in a direction A1 which is a direction in which the lever 66 is pulled up. In other words, the pressing member 86 exerts the pressing force in the direction A1 which is a direction in which the lever 66 is pulled up via the second locking portion 70 and the rotation shaft 64.

Further, with reference to FIG. 26 and FIG. 27, the operation of the locking unit 62 when the cover 32 is closed will be described. The angles illustrated in FIG. 26 and FIG. 27 is the opening angles of the lever 66 and 0 degree is a state where the lever 66 completely is closed. In addition, FIG. 26 and FIG. 27 illustrate the locking unit 62 and the engaging pins 78 and 88 on the main body portion 26a side, FIG. 26 is a view illustrating the locking unit 62 as viewed from the upstream side in the medium transporting direction and FIG. 27 is a view illustrating the locking unit 62 as viewed from the lower side in the device height direction. In addition, a state of each angle in FIG. 27 corresponds to a state of each angle in FIG. 26. In addition, in FIG. 26 and FIG. 27, the one-dot chain line denoted by reference numeral S1 indicate a position in which the engaging portion 74b protrudes from the first locking portion 68 in the device depth direction and the one-dot chain line denoted by reference numeral S2 indicates a position in which e engaging portion 82b protrudes from the second locking portion 70.

In a case where the opening angle of the lever 66 is 40 degrees, the cam follower 72a of the rotation member 72 of the first locking portion 68 is in a state where the cam portion 74a of the slider member 74 is pressed against the pressing force of the pressing member 76 to draw the engaging portion 74b into the rear surface side in the device depth direction. In this state, the engagement between the engaging portion 74b and the engaging pin 78 with each other is released. Similarly, the cam follower 80a of the rotation member 80 of the second locking portion 70 is in a state where the cam portion 82a of the slider member 82 is pressed against the pressing force of the pressing member 84 to draw the engaging portion 82b into the rear surface side in the device depth direction. In this state, the engagement between the engaging portion 82b and the engaging pin 88 with each other is released.

Next, when the opening angle of the lever 66 is changed from 40 degrees to 30 degrees, the rotation member 72 of the first locking portion 68 and the rotation member 80 of the second locking portion 70 rotate toward the upstream side in the medium transporting direction. Along with this operation, since the pressing amount of the cam portion 74a of the cam follower 72a decreases, the slider member 74 slides to the front surface side (left side of page of FIG. 26 and FIG. 27, −X-axis direction) in the device depth direction and thus the engaging portion 74b also protrudes toward the front surface side in the device depth direction. On the other hand, since the pressing amount of the cam portion 82a of the cam follower 80a also decreases, the slider member 82 slides to the rear surface side (right side of paper surface in FIG. 26 and FIG. 27, +X-axis direction) in the device depth direction and thus the engaging portion 82b also protrudes toward the rear surface side in the device depth direction. Here, in this example, the movement amount of the slider member 74 in the device depth direction is larger than the movement amount of the slider member 82.

Further, when the opening angle of the lever 66 is changed from 30 degrees to 20 degrees, the rotation member 72 of the first locking portion 68 and the rotation member 80 of the second locking portion 70 rotate toward the upstream side in the medium transporting direction and thus the pressing amount of the cam portion 74a of the cam follower 72a and the pressing amount of the cam portion 82a of the cam follower 80a decrease respectively. As a result, the slider member 74 slides to the front surface side in the device depth direction and the engaging portion 74b also protrudes toward the front surface side in the device depth direction. In this state, the engaging portion 74b is in contact with the engaging pin 78. On the other hand, although the slider member 82 slides to the rear surface side in the device depth direction and the engaging portion 82b also protrudes to the rear surface side in the device depth direction, the engaging portion 82b comes to a state of being not yet in contact with the engaging pin 88.

When the opening angle of the lever 66 is changed from 20 degrees to 10 degrees, the rotation member 72 of the first locking portion 68 and the rotation member 80 of the second locking portion 70 further rotate to the upstream side in the medium transporting direction and thus the pressing amount of the cam portion 74a of the cam follower 72a and the pressing amount of the cam portion 82a of the cam follower 80a decreases respectively. As a result, the slider member 74 slides to the front surface side in the device depth direction and the engaging portion 74b reaches S1 which is a position in which the engaging portion 74b protrudes in the device depth direction. In this state, the first locking portion 68 is switched from a state of being unlocked to a state of being locked.

On the other hand, the slider member 82 slides to the rear surface side in the device depth direction and the engaging portion 82b also protrudes to the rear surface side in the device depth direction. In this state, the engaging portion 82b is in contact with the engaging pin 88. This state is an example of a semi-tight state of the cover 32 described below.

When the opening angle of the lever 66 is changed from 10 degrees to 0 degree and the lever 66 completely closes, the rotation member 72 of the first locking portion 68 and the rotation member 80 of the second locking portion 70 are further rotated in the medium transporting direction. The cam follower 72a of the rotation member 72 is spaced apart from the cam surface of the cam portion 74a. In other words, the slider member 74 does not move in the device depth direction. A state where the first locking portion 68 is locked is maintained.

On the other hand, the pressing amount of the cam portion 82a of the cam follower 80a decreases, the slider member 82 slides to the front surface side in the device depth direction, and the engaging portion 82b reaches S2 which is a position in which the engaging portion 82b protrudes in the device depth direction. In this state, the second locking portion 70 is switched from a state of being unlocked to a state of being locked.

In other words, when the cover 32 is closed with respect to the main body portion 26a, the movement of the slider member 82 of the second locking portion 70 in the device depth direction is configured to be delayed with respect to the movement of the slider member 74 of the first locking portion 68. While the first locking portion 68 is switched from a state of being unlocked to a state of being locked at the opening angle of the lever 66 of 10 degrees, the second locking portion 70 is not switched from a state of being unlocked to a state of being locked unless the opening angle of the lever 66 is 0 degree.

In this example, when the cover 32 is in the semi-tight state, since the lever 66 is in a state of protruding from the upper surface 32c of the cover 32 by the pressing force of the pressing member 86 (for example, opening angle of lever 66 is 10 degrees), the semi-tight state of the cover 32 can be easily checked by visual inspection. On the other hand, when the opening angle of the lever 66 is 0 degree, since the second locking portion 70 is in a state of being locked, the cover 32 can be completely closed with respect to the main body portion 26a more reliably.

Here, a state where the cover 32 be completely closed and the semi-tight state will be further described. When the opening angle of the lever 66 is 0 degree, since the engaging portion 74b of the slider member 74 of the first locking portion 68 reaches S1 which is a position in which the engaging portion 74b of the slider member 74 of the first locking portion 68 protrudes in the device depth direction, the first locking portion 68 maintains a state of being locked. On the other hand, since the engaging portion 82b of the slider member 82 of the second locking portion 70 reaches S2 which is a position in which the engaging portion 82b of the slider member 82 of the second locking portion 70 protrudes in the device depth direction, the second locking portion 70 is switched from a state of being unlocked to a state of being locked.

In this state, when the cover 32 is viewed from a side as illustrated in FIG. 28, the lever 66 is completely stored in the recessed portion 32d with respect to the upper surface 32c of the cover 32 and the lever 66 is in a state of not floating with respect to the upper surface 32c. The state of the lever 66 illustrated in FIG. 28 is in a state where the cover 32 completely is closed with respect to the main body portion 26a.

On the other hand, as an example, when the opening angle of the lever 66 is 10 degrees, since the engaging portion 74b of the slider member 74 of the first locking portion 68 reaches S1 which is a position in which the engaging portion 74b of the slider member 74 of the first locking portion 68 protrudes in the device depth direction, the first locking portion 68 switches from a state of being unlocked to a state of being locked.

However, the engaging portion 82b of the slider member 82 of the second locking portion 70 is in a state of not completely entering below the engaging pin 88 and not reaching S2 which is a position in which the engaging portion 82b protrudes in the device depth direction. More specifically, as illustrated in FIG. 30, the engaging portion 82b of the second locking portion 70 is in a state of engaging with the engaging pin 88, that is, in a state where the engaging portion 82b is in a state of not completely protruding to the rear surface side in the device depth direction, that is, in a state of not completely entering below the engaging pin 88. In this state, since a state where the frictional force between the engaging portion 82b and the engaging pin 88 overcomes the pressing force of the pressing member 84 which presses the slider member 82 and thus the engaging portion 82b toward the rear surface side in the device depth direction, as long as the user does not further push the cover 32 from above, the above state, that is, the semi-tight state of the cover 32 is maintained.

When the cover 32 is in a semi-tight state with respect to the main body portion 26a, the path forming portion 32a (FIG. 3) of the cover 32 slightly floats in the medium transporting path 30 (FIG. 3), and thus there is a case where the medium transporting path (FIG. 3) is not properly formed and jam is generated in the transported medium.

In this example, in a state where the cover 32 is in the semi-tight state, that is, in a state where the cam portion 82a does not completely press the cam follower 80a, since the rotation shaft 64 is biased in a direction in which the lever 66 is pulled up by the pressing force of the pressing member 86, the lever 66 is in a state of being raised by a height L1 from the recessed portion 32d as illustrated in FIG. 29 by the pressing force (opening angle of lever 66 is 10 degrees). Accordingly, the user can check by visual inspection that the lever 66 protrudes from the upper surface 32c, that is, it is possible to determine a state where the cover 32 is semi-tightened with respect to the main body portion 26a.

Therefore, in this example, since it can be checked by visual inspection that the lever 66 protrudes from the upper surface 32c, it is possible to determine the semi-tight state of the cover 32. As a result, the cover 32 can be closed completely by opening/closing the cover 32 again or by pushing the cover 32 from above and thus closing the cover 32 and the generation of jam can be suppressed in the medium transporting path 30.

About Cable Cover

Next, a cable cover will be described with reference to FIG. 31 to FIG. 36. As illustrated in FIG. 31, a cable cover 90 is provided at an end portion on the rear surface side of the cover 32 in the device depth direction. A pickup roller 34, a feeding roller 36, a detection sensor (not illustrated), and the like that require electric power are disposed on the cover 32, and electric power cables for supplying electric power to the pickup roller 34, the feeding roller 36, the detection sensor, and the like, signal cables, and the like are extended from the main body portion 26a into the cover 32. The two-dot chain line in FIG. 31 schematically illustrates the wiring of these cables.

The cable cover 90 is configured to secure wiring space of the cable from the main body portion 26a into the cover 32 and to protect the cable by covering the cable. In addition, the cable cover 90 is configured to be rotatable with respect to the cover 32. When the cover 32 rotates with respect to the main body portion 26a, the cable cover 90 is configured to hold a predetermined posture with respect to the main body portion 26a. With reference to FIG. 32 to FIG. 35, the cable cover 90 includes a first cable cover member 92, a second cable cover member 94, and a sheet member 96.

As illustrated in FIG. 32, the first cable cover member 92 includes a lower base portion 92a, a lower arm portion 92b, and a pair of rotation shafts 92c. The lower base portion 92a is formed in a box shape and the upper side in the device height direction and the upstream side in the transporting direction open. The lower arm portion 92b protrudes from the end portion on the upstream side in the transporting direction of the lower base portion 92a toward the rear surface side in the device depth direction. In addition, the pair of rotation shafts 92c protrudes to the front surface side and the rear surface side in the device depth direction at the downstream side end portion of the lower base portion 92a in the transporting direction, respectively. In addition, a plurality of hooking portions 92d are provided on the side portion of the lower base portion 92a at gaps in the medium transporting direction.

As illustrated in FIG. 33, the second cable cover member 94 includes an upper base portion 94a and an upper arm portion 94b. The upper base portion 94a is formed in a box shape and the lower side in the device height direction and the upstream side in the transporting direction open. The upper arm portion 94b protrudes from the end portion on the downstream side of the upper base portion 94a in the transporting direction toward the rear surface side in the device depth direction. A plurality of hooked portions 94c are provided on the side portion of the upper base portion 94a at gaps in the medium transporting direction.

As illustrated in FIG. 32 and FIG. 33, the sheet member 96 has a shape that extends from the downstream side to the upstream side in the transporting direction and then curves and extends to the downstream side in the transporting direction. A pair of hooking portions 96b which protrudes in the device depth direction are provided on one end portion 96a of the sheet member 96. The hooking portion 96b is hooked on the hooked portion 94c of the second cable cover member 94. In addition, an adhesive member 98 is attached to the one end portion 96a. As an example, the adhesive member 98 is configured as a double-sided tape.

As illustrated in FIG. 34, the cable cover 90 is configured by attaching the second cable cover member 94 so as to interpose the sheet member 96 with respect to the first cable cover member 92. Specifically, the hooking portion 92d of the first cable cover member 92 is hooked on the hooked portion 94c of the second cable cover member 94 and the first cable cover member 92 and the second cable cover member 94 are assembled with each other. Here, the sheet member 96 is attached to the second cable cover member 94 via the adhesive member 98 attached to the one end portion 96a.

With reference to FIG. 35 and FIG. 36, the other end portion 96c of the sheet member 96 is accommodated in a slit 32e provided in the cover 32. Then, the other end portion 96c of the sheet member 96 is configured to be slid in the slit 32e according to the rotation of the cover 32 with respect to the main body portion 26a. When the cover 32 is opened with respect to the main body portion 26a (see FIG. 36), the sheet member 96 prevents an exposure of a cable (not illustrated) which covers the upper portion of the rotation shaft 92c of the cable cover 90 and passes through the cable cover 90.

Modification Example of Example (1) In this example, although the holding unit 40 is applied to the cover 32, the holding unit is not limited to this configuration, and, in addition, the holding unit can be applied to a cover or the like which opens/closes at the time of component replacement.

(2) In this example, although it is configured that the lever 66 protrudes from the upper surface 32c so as to determine the semi-tight state of the cover 32, for example, as illustrated in FIG. 30, a step corresponding to the height L2 formed between the upper surface 32c of the cover 32 in the device depth direction and the upper portion of the main body portion 26a is configured to be larger and thus the semi-tight state of the cover 32 may be determined by checking the step by visual inspection.

To summarize the above description, an ADF portion 26 includes a main body portion 26a that constitutes a medium transporting path 30 through which a medium is transported; a cover 32 that is provided to be rotatable with respect to the main body portion 26a, forms the medium transporting path 30 between the cover and the main body portion 26a by closing thereof, and exposes the medium transporting path 30 by opening thereof, and a holding unit 40 that holds the cover 32 in a state where the cover 32 is open, in which the holding unit 40 includes a rotation member 42 that has a supporting portion 42b which can be switched between a state of being raised up and a state of being dropped down by rotation thereof and supports the cover 32 and applies a force to the cover 32 in an opening direction by the supporting portion 42b engaging with the cover 32 and a pressing unit 44 that presses the rotation member 42 in the raised direction, and in which the holding unit further includes a configuration in which a force that the supporting portion 42b applies to the cover 32 in the opening direction due to a pressing force to the rotation member 42 generated by the pressing unit 44 and a force that the cover 32 tries to close are balanced with each other according to a rotation angle of the rotation member 42.

According to the configuration, since the supporting portion 42b of the rotation member 42 applies a force to the cover 32 in the opening direction when the cover 32 is closed, the cover 32 is opened using a smaller force.

In addition, since there is the configuration in which the force that the supporting portion 42b of the rotation member 42 applies to the cover 32 in the opening direction and the force that the cover 32 tries to close are balanced with each other according to the rotation angle of the rotation member 42, the cover 32 can close by a user applying the force to the cover 32 in the closing direction in a state of being balanced. In other words, the user can close the cover 32 using only one hand thereof and thus good operability is obtained.

Further, since the supporting portion 42b of the rotation member 42 applies a force to the cover 32 in the opening direction even when the cover 32 is closed, the vigorous closing of the cover 32 can be avoided and the generation of collision sound and damage thereof can be suppressed or avoided.

Since the above functions can be realized by at least one of the holding unit 40, the complication of the structure and increase in cost can be suppressed.

The rotation member 42 can engage with and disengage from the cover 32, and disengages from the cover 32 by the rotation angle of the rotation member 42 reaching the upper limit when the cover 32 exceeds a predetermined opening angle.

If the rotation member 42 rotates more than necessary when the cover 32 is opened, there is a case where the cover 32 comes to a state of being locked without the cover 32 rotating in a direction in which the rotation member 42 falls down when the cover 32 tries to close, according to an angle formed between the cover 32 and the rotation member 42.

According to the configuration, since the rotation member 42 has a configuration in which the rotation member 42 can engage with and disengage from the cover 32 and the rotation member 42 disengages from the cover 32 by the rotation angle of the rotation member 42 reaching the upper limit when the cover 32 exceeds a predetermined opening angle, it is possible to avoid that the cover comes to a state of being locked.

The pressing unit 44 does not apply an external force in the raised direction to the rotation member 42 in a state where the cover 32 is closed.

Since the cover 32 forms a medium transporting path 30 along with the main body portion 26a in a closed state, there is a fear that if the cover 32 is opened even slightly, jam is generated in the medium transporting path 30.

According to the configuration, the problem that the cover 32 is open slightly inappropriately can be suppressed.

The rotation member 42 includes a cam follower 42a on a rotation center side thereof and the pressing unit 44 includes a cam 48 which presses the cam follower 42a and a pressing member 46 that applies a pressing force to the cam 48. According to the configuration, the pressing unit 44 can be configured by a simple structure and at a low cost.

A plurality of rotation angles of the rotation member 42 are set in which the force that the supporting portion 42b of the rotation member 42 applies to the cover 32 in the opening direction and the force that the cover 32 tries to close are balanced with each other. According to the configuration, the cover 32 can be held at a plurality of opening angles and thus the convenience of the user is improved.

The cover 32 includes a sliding contact surface 50 which is positioned on an upper side with respect to the supporting portion 42b and with which the supporting portion 42b is slidingly in contact when the cover 32 is opened/closed, and a plurality of protrusions 50a and 50b are provided on the sliding contact surface 50 with a predetermined gap in a sliding contact direction with the supporting portion 42b.

According to the configuration, since the cover 32 includes the sliding contact surface 50 which is positioned on the upper side with respect to the supporting portion 42b and with which the supporting portion 42b is slidingly in contact when the cover 32 is opened/closed and the plurality of protrusions 50a and 50b are provided on the sliding contact surface 50 with the predetermined gap in the sliding contact direction with the supporting portion 42b, that is, since there is a configuration in which the opening angle of the cover 32 is held by the supporting portion 42b being caught by the protrusion, the configuration in which the cover 32 is held at the plurality of opening angle can be obtained with a simplified structure and at a low cost.

The cover 32 has a sliding contact surface 50 which is positioned on an upper side with respect to the supporting portion 42b and with which the supporting portion 42b is slidingly in contact when the cover 32 is opened/closed and a first engaging portion 52 which is positioned so as to interpose the supporting portion 42b between the cover 32 and the sliding contact surface 50 in a state where the cover 32 is closed and when the cover 32 is opened from a closed state, the first engaging portion 52 applies a force to the supporting portion 42b in a raised direction.

If there is a large gap between the sliding contact surface 50 and the supporting portion 42b when the cover 32 is opened from a closed state, when the rotation member 42 be raised up by the pressing force of the pressing unit 44, there is a fear that supporting portion 42b abuts against the sliding contact surface 50 vigorously and thus an unpleasant collision sound is generated.

However, according to the configuration, since the supporting portion 42b is interposed between the sliding contact surface 50 and the first engaging portion 52 in a state where the cover 32 is closed and when the cover 32 is opened from a closed state, the first engaging portion 52 applies a force to the supporting portion 42b in a raised direction, the collision sound can be suppressed or avoided without the large gap being formed between the sliding contact surface 50 and the supporting portion 42b when the cover 32 is opened from a closed state.

The cover 32 includes a second engaging portion 54 which is positioned at a location farther from the supporting portion 42b than the first engaging portion 52 below the supporting portion 42b in a state where the cover 32 is closed, an inclined surface 54a is formed below the second engaging portion 54, and thus the second engaging portion 54 rides over the supporting portion 42b and enters below the supporting portion 42b by the inclined surface 54a when the cover 32 is closed from a state where the cover 32 is open and the rotation member 42 falls down.

According to the configuration, since the cover 32 includes a second engaging portion 54 which is positioned at a location farther from the supporting portion 42b than the first engaging portion 52 below the supporting portion 42b in a state where the cover 32 is closed, even if the supporting portion 42b is in a state of not being capable of being raised by the damage or the wear of the first engaging portion 52, the second engaging portion 54 can be raised the supporting portion 42b and thus the function of the holding unit 40 is secured.

On the other hand, in a case where such a second engaging portion 54 is provided, when the rotation member 42 falls down independently from the cover 32 by the hand of the user, even if the cover 32 tries to close, there is a fear that the second engaging portion 54 collides with the supporting portion 42b and thus the cover 32 cannot be closed.

However, according to the configuration, the inclined surface 54a is formed below the second engaging portion 54, and when the cover 32 is closed from a state where the cover 32 is open and the rotation member 42 falls down, since the second engaging portion 54 can ride over the supporting portion 42b and enter below the supporting portion 42b by the inclined surface 54a, the cover 32 can be in a state of being correctly closed.

The scanner 14 includes an image reading unit 28 that reads a medium and the ADF portion 26 that serves as a medium transporting device that transports a medium.

The ADF portion 26 includes the main body portion 26a; the cover 32 that can be opened/closed at least a portion of the main body portion 26a by rotating with respect to the main body portion 26a; and the holding unit 40 that holds the cover 32 in a state where the cover 32 is open, in which the holding unit 40 includes a rotation member 42 that has the supporting portion 42b which can be switched between a state of being raised up and a state of being dropped down by rotation thereof and supports the cover 32, and applies a force to the cover 32 in an opening direction by the supporting portion 42b engaging with the cover 32, and the pressing unit 44 that presses the rotation member 42 in the raised direction, and in which the holding unit 40 further includes a configuration in which a force that the supporting portion 42b applies to the cover 32 in the opening direction due to a pressing force to the rotation member 42 generated by the pressing unit 44 and a force that the cover 32 tries to close are balanced with each other according to a rotation angle of the rotation member 42.

In addition, in this example, although the holding unit 40, the regulation belt 56, the locking unit 62 and the cable cover 90 according to the disclosure are applied to an ink jet printer as an example of a recording apparatus, the holding unit 40, the regulation belt 56, the locking unit 62 and the cable cover 90 can be also applied to other liquid ejecting apparatus in general.

Here, the liquid ejecting apparatus is not limited to a recording apparatus such as a printer, a copying machine, a facsimile, or the like which uses an ink jet type recording head and records on a recording medium by discharging ink from the recording head and includes an apparatus that adheres liquid to a medium to be ejected on by ejecting the liquid corresponding the use thereof instead of ink from the liquid ejecting head corresponding to the ink jet type recording head to the medium to be ejected on corresponding to the recorded medium.

The liquid ejecting head includes a color material ejecting head which is used for manufacturing a color filter of a liquid crystal display or the like, an electrode material (conductive paste) ejecting head which is used for forming an electrode of an organic EL display, a surface emission display (FED), or the like, a bioorganic material ejecting head which is used for manufacturing a biochip, a sample ejecting head as a precision pipette, and the like, as an example, in addition to the recording head.

It will be appreciated that the disclosure is not limited to the examples described above, various modifications are possible within the scope of the disclosure described in the claims, and various modifications are also included within the scope of the present disclosure.

What is claimed is:

1. A medium transporting device comprising:
   a main body portion that constitutes a medium transporting path through which a medium is transported;
   an opening/closing body that is provided to be rotatable with respect to the main body portion, forms the medium transporting path between the opening/closing body and the main body portion by closing thereof, and exposes the medium transporting path by opening thereof; and
   a holding unit that holds the opening/closing body in a state where the opening/closing body is open,
   wherein the holding unit includes:
      a rotation member that has a supporting portion which is capable of being displaced between a state of being raised up and a state of being dropped down by rotation thereof and supports the opening/closing body and applies a force to the opening/closing body in an opening direction by the supporting portion engaging with the opening/closing body, and
      a pressing unit that presses the rotation member in the raised direction, and
   wherein the holding unit further includes a configuration in which a force that the supporting portion applies to the opening/closing body in the opening direction due to a pressing force to the rotation member generated by the pressing unit and a force that the opening/closing body tries to close are balanced with each other according to a predetermined rotation angle of the rotation member,
   wherein the supporting portion of the rotation member is capable of engaging with and disengaging from the opening/closing body and disengages from the opening/closing body by the rotation angle of the rotation member reaching the upper limit when the opening/closing body exceeds a predetermined opening angle.

2. The medium transporting device according to claim 1, wherein the pressing unit does not apply an external force in the raised direction to the rotation member in a state where the opening/closing body is closed.

3. The medium transporting device according to claim 2, wherein the opening/closing body has
   a sliding contact surface which is positioned on an upper side with respect to the supporting portion and with which the supporting portion is slidingly in contact when the opening/closing body is opened/closed, and
   a first engaging portion which is positioned so as to interpose the supporting portion between the opening/closing body and the sliding contact surface in a state where the opening/closing body is closed, and
   wherein when the opening/closing body is opened from a closed state, the first engaging portion applies a force to the supporting portion in a raised direction.

4. The medium transporting device according to claim 3, wherein the opening/closing body includes a second engaging portion which is positioned at a location farther from the supporting portion than the first engaging portion below the supporting portion in a state where the opening/closing body is closed, and
   wherein an inclined surface is formed below the second engaging portion, and thus the second engaging portion rides over the supporting portion and enters below the supporting portion by the inclined surface when the opening/closing body is closed from a state where the opening/closing body is open and the rotation member falls down.

5. The medium transporting device according to claim 1, wherein the rotation member includes a cam follower on a rotation center side thereof, and
   wherein the pressing unit includes
      a cam which presses the cam follower, and
      a pressing member that applies a pressing force to the cam.

6. The medium transporting device according to claim 1, wherein a plurality of rotation angles of the rotation member are set in which the force that the supporting portion of the rotation member applies to the opening/closing body in the opening direction and the force that the opening/closing body tries to close are balanced with each other.

7. The medium transporting device according to claim 6, wherein the opening/closing body includes a sliding contact surface which is positioned on an upper side with respect to the supporting portion and with which the supporting portion is slidingly in contact when the opening/closing body is opened/closed, and
   wherein a plurality of protrusions are provided on the sliding contact surface with a predetermined gap in a sliding contact direction with the supporting portion.

8. An image reading apparatus comprising:
   a reading unit that reads a medium; and
   the medium transporting device according to claim 1 that transports the medium.

9. An opening/closing device comprising:
   a main body portion;
   an opening/closing body that is capable of being opened/closed at least a portion of the main body portion by rotating with respect to the main body portion; and
   a holding unit that holds the opening/closing body in a state where the opening/closing body is open,
   wherein the holding unit includes:
      a rotation member that has a supporting portion which is capable of being displaced between a state of being raised up and a state of being dropped down by rotation thereof, supports the opening/closing body, and applies a force to the opening/closing body in an opening direction by the supporting portion engaging with the opening/closing body, and
      a pressing unit that presses the rotation member in the raised direction, and
   wherein the holding unit further includes a configuration in which a force that the supporting portion applies to the opening/closing body in the opening direction due to a pressing force to the rotation member generated by the pressing unit and a force that the opening/closing body tries to close are balanced with each other according to a predetermined rotation angle of the rotation member,
   wherein the supporting portion of the rotation member is capable of engaging with and disengaging from the opening/closing body and disengages from the opening/closing body by the rotation angle of the rotation member reaching the upper limit when the opening/closing body exceeds a predetermined opening angle.

10. A medium transporting device comprising:

a main body portion that constitutes a medium transporting path through which a medium is transported;

an opening/closing body that is provided to be rotatable with respect to the main body portion, forms the medium transporting path between the opening/closing body and the main body portion by closing thereof, and exposes the medium transporting path by opening thereof; and a holding unit that holds the opening/closing body in a state where the opening/closing body is open, wherein the holding unit includes:

a rotation member that has a supporting portion which is capable of being displaced between a state of being raised up and a state of being dropped down by rotation thereof and supports the opening/closing body and applies a force to the opening/closing body in an opening direction by the supporting portion engaging with the opening/closing body, and a pressing unit that presses the rotation member in the raised direction and applies a pressing force to the opening/closing body in the opening direction by the rotation member, and wherein the holding unit further includes a configuration in which a force that the supporting portion applies to the opening/closing body in the opening direction due to the pressing force to the rotation member generated by the pressing unit and a force that the opening/closing body tries to close are balanced with each other according to a predetermined rotation angle of the rotation member, wherein the opening/closing body includes a sliding contact surface which is positioned on an upper side with respect to the supporting portion and with which the supporting portion is slidingly in contact when the opening/closing body is opened/closed, and wherein a plurality of protrusions are provided on the sliding contact surface with a predetermined gap in a sliding contact direction with the supporting portion.

* * * * *